(12) United States Patent
Kinney et al.

(10) Patent No.: US 7,982,956 B2
(45) Date of Patent: *Jul. 19, 2011

(54) DIRECT BEAM SOLAR LIGHT SYSTEM

(75) Inventors: Laurence F Kinney, Boulder, CO (US);
Jim Walsh, Boulder, CO (US); William Ross McCluney, Cape Canaveral, FL (US); Gerald L Cler, Windsor, CO (US); John Hutson, Austin, TX (US)

(73) Assignees: University of Central Florida Research Foundation, Inc., Orlando, CA (US); Sunflower Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/622,833

(22) Filed: Nov. 20, 2009

(65) Prior Publication Data

US 2010/0067114 A1    Mar. 18, 2010

Related U.S. Application Data

(62) Division of application No. 11/501,523, filed on Aug. 9, 2006, now Pat. No. 7,639,423.

(60) Provisional application No. 60/706,955, filed on Aug. 10, 2005.

(51) Int. Cl.
*G02B 17/00* (2006.01)

(52) U.S. Cl. ........ 359/591; 359/592; 359/595; 359/597; 359/853

(58) Field of Classification Search ................. 359/591, 359/592, 595, 597, 893; 126/573, 600, 679; 362/1; 385/900

See application file for complete search history.

(56) References Cited

U.S. PATENT DOCUMENTS

| | | | | |
|---|---|---|---|---|
| 668,404 | A * | 2/1901 | Hanneborg | 359/597 |
| 2,022,144 | A * | 11/1935 | Nicolson | 353/3 |
| 3,511,559 | A * | 5/1970 | Foster | 359/591 |
| 4,086,485 | A | 4/1978 | Kaplow | |
| 4,201,197 | A * | 5/1980 | Dismer | 126/600 |
| 4,246,477 | A * | 1/1981 | Latter | 250/214 AL |
| 4,297,000 | A * | 10/1981 | Fries | 362/557 |
| 4,306,769 | A * | 12/1981 | Martinet | 359/597 |
| 4,349,245 | A * | 9/1982 | Kliman | 359/597 |
| 4,389,085 | A * | 6/1983 | Mori | 359/591 |
| 4,429,952 | A * | 2/1984 | Dominguez | 359/591 |
| 4,593,976 | A | 6/1986 | Eijadi | |
| 4,720,170 | A * | 1/1988 | Learn, Jr. | 359/597 |
| 4,922,088 | A | 5/1990 | Kasuya | |
| 5,716,442 | A * | 2/1998 | Fertig | 136/246 |

(Continued)

*Primary Examiner* — Christopher E Mahoney
*Assistant Examiner* — Warren K Fenwick
(74) *Attorney, Agent, or Firm* — Brian S. Steinberger; Law Offices of Brian S. Steinberger, P.A.

(57) ABSTRACT

A direct beam solar lighting system for collecting and distributing sunlight into a room. The system includes a rotatable solar collector head to receive sunlight and to reflect the sunlight downward into a transition tube having a reflective interior surface. The light-concentrating transition tube reflects sunlight into a reflective light tube which directs the reflected sunlight through a plenum space into the room. The system includes a drive mechanism for rotating the rotatable solar collector, and a light fixture at end of the light tube to disburse said reflected sunlight onto a ceiling and a wall in the room. In an embodiment the system includes one or more homogenizing reflectors within the solar collector for collecting the sunlight and directing the sunlight more uniformly over the aperture of the transition tube. In an alternative embodiment, the solar collector includes a rotatable tiltable mirror for providing two-axis tracking.

30 Claims, 26 Drawing Sheets

U.S. PATENT DOCUMENTS

| | | | |
|---|---|---|---|
| 5,729,387 A * | 3/1998 | Takahashi et al. | 359/591 |
| 5,907,648 A | 5/1999 | Miller | |
| 6,128,135 A * | 10/2000 | Stiles et al. | 359/597 |
| 6,178,707 B1 | 1/2001 | Bengston | |
| 6,299,317 B1 | 10/2001 | Gorthala | |
| 6,557,804 B1 | 5/2003 | Carroll | |
| 6,691,701 B1 * | 2/2004 | Roth | 126/685 |
| 7,639,423 B2 * | 12/2009 | Kinney et al. | 359/591 |
| 2004/0022071 A1 | 2/2004 | Cheng | |
| 2004/0050380 A1 * | 3/2004 | Abe et al. | 126/572 |
| 2004/0118447 A1 | 6/2004 | Muhs | |
| 2006/0174867 A1 | 8/2006 | Schaafsma | |
| 2006/0249143 A1 * | 11/2006 | Straka | 126/600 |

\* cited by examiner

DIRECT BEAM SOLAR LIGHT SYSTEM

This application is a divisional application of U.S. application Ser. No. 11/501,523 filed on Aug. 9, 2006, now U.S. Pat. No. 7,639,423 allowed, which claims the benefit of priority to, U.S. Provisional Application No. 60/706,955 filed on Aug. 10, 2005.

FIELD OF THE INVENTION

This invention relates to solar interior lighting and, in particular, to methods, systems, apparatus and devices for implementing a direct beam solar lighting system for collecting, transmitting, and distributing sunlight into an indoor room with optional supplemental lighting.

BACKGROUND AND PRIOR ART

Competing technology can be divided into two categories. The first category includes conventional toplighting with rectangular roof skylights, clerestories, roof monitors, roof windows, and tubular skylights, the latter known generically as tubular daylighting devices (TDDs). Some problems exhibited by most of these include:
1. Glare potential, from direct beam sunlight entering the space in such a way that people can see this very bright light directly (and indirectly by reflection from surfaces in the room).
2. Solar overheating, resulting from large aperture areas not moderated by heat shading or reflecting surfaces or shades.
3. Wintertime heat loss by conduction, convection, and radiation of room heat upward through the skylight to the outdoors, especially troublesome on cold winter nights.
4. A common need for custom architectural work, to adjust the building design to accommodate the daylighting system without excessive glare or overheating, this adding to the cost and complexity of the installation.
5. Spatially non uniform illumination over the space.
6. Temporally non uniform illumination over the course of the day, as the sun rises, moves through the sky, and sets.
One or Two-Axis Tracking The second category of potentially competing technology, based on one or two-axis tracking designs, utilizes concentrating solar collectors of the "dish" reflector or Fresnel lens type, coupled with sophisticated optical systems to capture the concentrated solar flux and put it into light pipes for distribution to building spaces. Some of the distribution systems utilize solid or liquid light pipe media, such as fiber optics. Some of the problems exhibited by prior art daylighting systems include:
1. High expense for the design and manufacture of the high-quality optical components, such as primary mirrors, lenses, or special non-imaging concentrators, and relay mirrors and lenses.
2. High expense for the complex mechanisms required to track the sun via the primary mirror in both azimuth and altitude.
3. High expense to design and fabricate the building to accommodate these complex optical systems.
4. Propensity for tracking mechanisms to fail when exposed to the sun and weather.
5. Light losses, both in flux transmitted and color distortions, associated with absorption of light flux as it travels through solid or liquid media.
6. Tracking mechanisms often require high accuracy and must be calibrated to and maintain tight tolerances The primary problem with TDDs and horizontal rectangular-aperture roof skylights is that as the sun's altitude angle (angular distance above the horizon) decreases, the effective size of the device's entrance aperture decreases as well, so that less flux is captured by the device (while the potential heat loss remains high, especially for large aperture skylights). Furthermore, as the solar altitude decreases, the angle of incidence on the wall of the reflective light tube (or the skylight well or shaft) also increases, thereby increasing both flux absorption per reflection and the number of reflections for a ray of sunlight to propagate down the tube to the space below. The result is a substantial decline in skylight illumination performance with solar altitude angle.

In order to capture enough diffuse sky light flux at low sun angle (mornings and afternoons), both TDD and conventional skylight apertures have to be increased. With these enlargements also come increases in heat flux into and out of the building through the skylight by the mechanisms of radiation, conduction, and convection.

Sidelighting from windows in walls is not included in the above competing options because it is not available for the core spaces of buildings, far removed from an exterior wall, the subject of this application is also intended to provide daylight illumination to areas adjacent to the window when for various reasons the window illumination is inadequate, and because this invention is also intended to provide daylight illumination to both spaces distant from a window wall and windowless building spaces even when they are adjacent to an exterior wall.

The prior art includes conventional rectangular- and round-aperture roof skylights, including those with planar, domed, and pyramidal glazing made of glass or transparent plastic, and tubular daylighting devices of all kinds. Specific patents more closely allied with the current application are listed below.

U.S. Pat. No. 5,493,824 issued to Lee Webster on Feb. 27, 1996 describes a system whereby a glazed aperture faces the sun and is tracked in azimuth. It also contains reflective vanes behind the glazing which redirect incident direct beam sunlight downward into the room below. The vanes also are adjusted to optimize performance as the sun moves up and down relative to the device. The device described includes a housing with an opening for receiving sunlight. The opening is covered with an ultraviolet-deflecting lens and the housing contains reflectors which direct sunlight through a conduit to a diffuser. The housing rests upon and is rotatable with respect to an annular base. A horizontal sensor arrangement controls rotational movement of the housing with respect to the base to maintain optimum horizontal alignment of the reflectors with respect to the sun. A vertical sensor arrangement causes vertical angular movement of the reflectors to maintain optimum vertical alignment of the reflectors with respect to the sun. The light conduit contains an infrared-deflecting lens to filter out infrared radiation. A dead air space placed in the light conduit prevents heat transfer as light is transmitted along the conduit.

U.S. Patent Publication No 2004/0118447 by Muhs is similar to U.S. Pat. No. 6,128,135 issued to Stiles et al. on Oct. 3, 2000 because the principles of operation and much of the optics are quite similar. The difference is that Muhs lacks a tertiary reflector, which in the Kinney case is planar. Instead, the Muhs patent sends the light from the secondary mirror to a flexible fiber optic bundle, an expensive option with potential optical problems. There could also be differences in the shapes of the primary and secondary mirrors between the two patents. The Kinney primary mirror is concave parabolic and the secondary is convex parabolic.

U.S. Patent Publication No. 2004/0050380 by Hiroshi Abe shows an electronic diagram that has reflective vanes which track in azimuth and that the vanes are tilted from the vertical by varying amounts. The purposes of the vanes are different in the two designs. In the Abe patent, these vanes are the primary reflecting means to redirect sunlight downward into the room below. The second two-axis tracking system has no multiple tracking reflecting vanes.

U.S. Pat. No. 6,691,701 issued to Roth on Feb. 17, 2004 is nearly duplicate of the '139 tracking patent, in having a primary mirror with a hole in it, a secondary reflector, and a tracking planar tertiary reflector sending a beam of concentrated sunlight vertically downward into a light pipe.

U.S. Pat. No. 6,557,804 issued to Carroll May 6, 2003 is intended for space propulsion, not for illumination and shares no similarity with the current application, except possibly through the gear and motor rotating mechanism.

U.S. Pat. No. 6,299,317 issued to Gorthala on Oct. 9, 2001 is a clever design involving components that have been known generically for some time, but has limitations mainly due to the large spread of the rays emerging from the secondary concentrator into the optical fiber, meaning that many of the rays from the concentrator will be incident at large angles on the fiber entrance aperture and will undergo many reflections and increased path lengths through the optical fiber, causing substantial losses along the way. Heating of the optical fiber through absorption when the sky is clear and with high concentration ratios is a problem noted by other experimenters attempting to use solid light pipes in similar applications.

U.S. Pat. No. 5,907,648 issued to Miller on May 29, 1999 describes a beam fiber optic spotlight luminaire and U.S. Pat. No. 4,720,170 issued to Learn discloses tracking primary and secondary mirrors, like the Muhs patent, sending concentrated beam sunlight into a fiber optic or other flexible light pipe and suffers from the problems of such mentioned in the description the 2004/0118447 publication. The patent's FIG. 2 offers a methodology for ameliorating the problem by passing the captured concentrated beam sunlight through a column of clean water, thereby stripping off much of the infrared portion of the solar spectrum, as described in McCluney, Ross, "Color-rendering of daylight from water-filled light pipes," *Solar Energy Materials*, Vol. 21, 2-3 Dec. 1990, pp. 191-206. FIG. 3 offers a methodology similar to the Stiles patent for directing the concentrated daylighting into a light pipe, but this method requires a flexible light piping system to accommodate declination changes and places the planar reflector in front of the primary mirror. This is an equatorial design requiring seasonal adjustment of the declination but which tracks around an axis through the light pipe on a daily basis. This patent offers the unique characteristic of claiming a military use of solar energy. A means of switching between solar and electric lighting is claimed but insufficiently described.

U.S. Pat. No. 4,429,952 issued to Dominguez is the one known commercially as the "Sol-Luminaire" skylight, a skylight with a tracking planar mirror above it. This is a closed loop design, it obtains feedback from the position of the sun and corrects itself based on this feedback. This method can be fooled by passing clouds.

U.S. Pat. No. 4,389,085 issued to Mori on Jun. 21, 1983 is a daylighting system that was promoted for a while a decade or two ago. It suggests a variety of means for collecting sunlight and distributing it to interior spaces. All are relatively high-tech in nature and generally are expected to be expensive. No control system is claimed. The unconventional Fresnel-lens-like drawings are clever and interesting, but probably more artistic in use than practical.

U.S. Pat. No. 4,246,477 issued to Latter on Jan. 20, 1981 is an equatorial tracking Fresnel lens plus reflectors and piping system with lenses for refocusing the solar beam for long-distance piping and distribution into buildings. The Fresnel lens as shown is too small to deliver useful illumination to all but a tiny area of a building. Scaling it up to large enough size to be useful might be possible, but expensive. The extensive piping system in particular, with associated high-quality optical components, should prove very expensive and economically prohibitive.

U.S. Pat. No. 4,086,485 issued to Kaplow in 1978 suggests the use of an array of apparently small Cassegrain telescopic systems with primary and secondary mirrors, meaning that the whole system requires tracking, apparently for focusing solar radiation onto small photovoltaic sensors for the generation of electricity. No means for illumination distribution are shown in the drawings and the means of tracking is not very clear. This patent has a closed loop system for tracking.

SUMMARY OF THE INVENTION

A primary objective of the invention is to provide new methods, systems, apparatus and devices to provide daylight illumination to building spaces with or without windows.

A secondary objective of the invention is to provide new methods, systems, apparatus and devices to provide an optical design of the aperture, reflecting mirror, and light shaft to accommodate solar altitude variations without the need for additional tracking, while increasing throughput at low sun angles and attenuating it at high values, to provide more constant illumination throughout the day.

A third objective of the invention is to provide a new method, system, apparatus and device making up a retroreflector to direct sunlight exiting the lower portions of the system onto a light-colored (diffusely reflecting) ceiling from which light is diffused into the space below, resulting in low-glare, and well-distributed natural light falling on work surfaces.

A fourth objective of the invention is to provide new methods, systems, apparatus and devices to improve the capture of flux from the sun when the sun is near the horizon.

A fifth objective of the present invention is to provide new methods, systems, apparatus and devices that requires little alteration of building design and reduce the space needed between the roof and ceiling for installation.

A sixth objective of the invention is to provide new methods, systems, apparatus and devices for direct beam solar lighting systems using an optical system that provides near maximum delivery of illumination to the workspace with an acceptably large azimuth tolerance in order to reduce fluctuations of the delivered illumination during operation due to intermittent tracking actuation, thereby allowing duty-cycled operation rather than continuous tracking, and also expanding orientation error limits.

A seventh objective of the present invention is to provide apparatus, methods, systems and devices for a single-axis tracking mechanism that is very simple, inexpensive, and can be made to be very reliable and durable. In addition, the system of the current application uses a retroreflector to direct sunlight exiting the lower portions of the system onto a light-colored (diffusely reflecting) ceiling from which light is diffused into the space below. The result is low-glare, well-distributed natural light falling on the work surfaces below.

The present invention seeks to overcome problems through the use of an aperture that faces more toward the horizon, coupled with mirrors that reflect near-horizon sunlight down a light shaft into the room below where it may strike a retroreflector, while attenuating radiation from the sun when it is higher in the sky, thereby balancing the problems conventional horizontal skylights and tubular daylighting devices have with low flux throughput at low sun angles and excessively high flux at high sun angles. In order to maintain good flux-capturing ability throughout the day, the entire head, or sun-capturing component, of the primary embodiment of this invention is made to rotate around a vertical axis, tracking the sun's movement in azimuth only. Thus, relative to the sun-capturing component, the sun only moves up and down in the sky throughout the day.

The optical design of the aperture, reflecting mirrors, and light shaft are made to accommodate these solar altitude variations without the need for additional tracking, increasing throughput at low sun angles and attenuating it at high angles to provide more constant illumination throughout the day. The sun's apparent motion up and down in the sky relative to the system (elevation) is accommodated by the optical design of the system, which is intended to accentuate the capture and distribution of sunlight when the sun is low in the sky, near to the horizon. As the sun climbs higher in the sky relative to the azimuth-rotating sun harvesting head, its illuminance increases due to increasing atmospheric transmittance (higher sun rays pass through less atmosphere than do lower ones). The sun harvesting head presents a decreasing projected aperture area as the sun rises, thereby attenuating the sun's flux with increasing solar altitude angle, producing room illumination that is more constant in time over the course of a day.

In an embodiment, the reflective elements that move to track the sun are encapsulated within a fixed, transparent enclosure. The difference is that it allows for the moveable elements to be very light weight since they are not exposed to the forces of external weather. The benefits are that the overall design is smaller and lighter in weight, it requires very little power to operate, the mechanism will not get jammed due to the accumulation of ice or snow, and a sliding weather seal is not required. The moving elements are supported on a vertical axis with a bearing (or bushing) at top and bottom. The lower bearing is directly in the path of the solar flux that is being routed from the moveable reflecting elements to the light pipe and is supported by either a transparent surface or a plurality of narrow spokes in order to minimize light losses.

For the third embodiment, reflective rectangular vanes 5 shown in FIGS. 8 and 9 are added to the sun-harvesting head, as a novel means for sending light from the head more uniformly over the redirecting reflector 9 and 10 in the drawings. The result is more uniform distribution of light around the room. The outer diameter of lower reflecting ring 10 is made large enough so that rays emerging from the light pipe 8 cannot reach human occupants of the room directly, thereby reducing glare.

In the fourth embodiment, additional reflecting rings 11 shown in FIGS. 10 and 11 are added as alternate glare reduction elements. Their purpose is to allow lower reflecting ring 10 to have a smaller diameter while still preventing rays emerging from light pipe 8 from reaching human occupants of the room directly.

Further objects and advantages of this invention will be apparent from the following detailed description of preferred embodiments which are illustrated schematically in the accompanying drawings.

DESCRIPTION OF THE PREFERRED EMBODIMENTS

Figure 1:
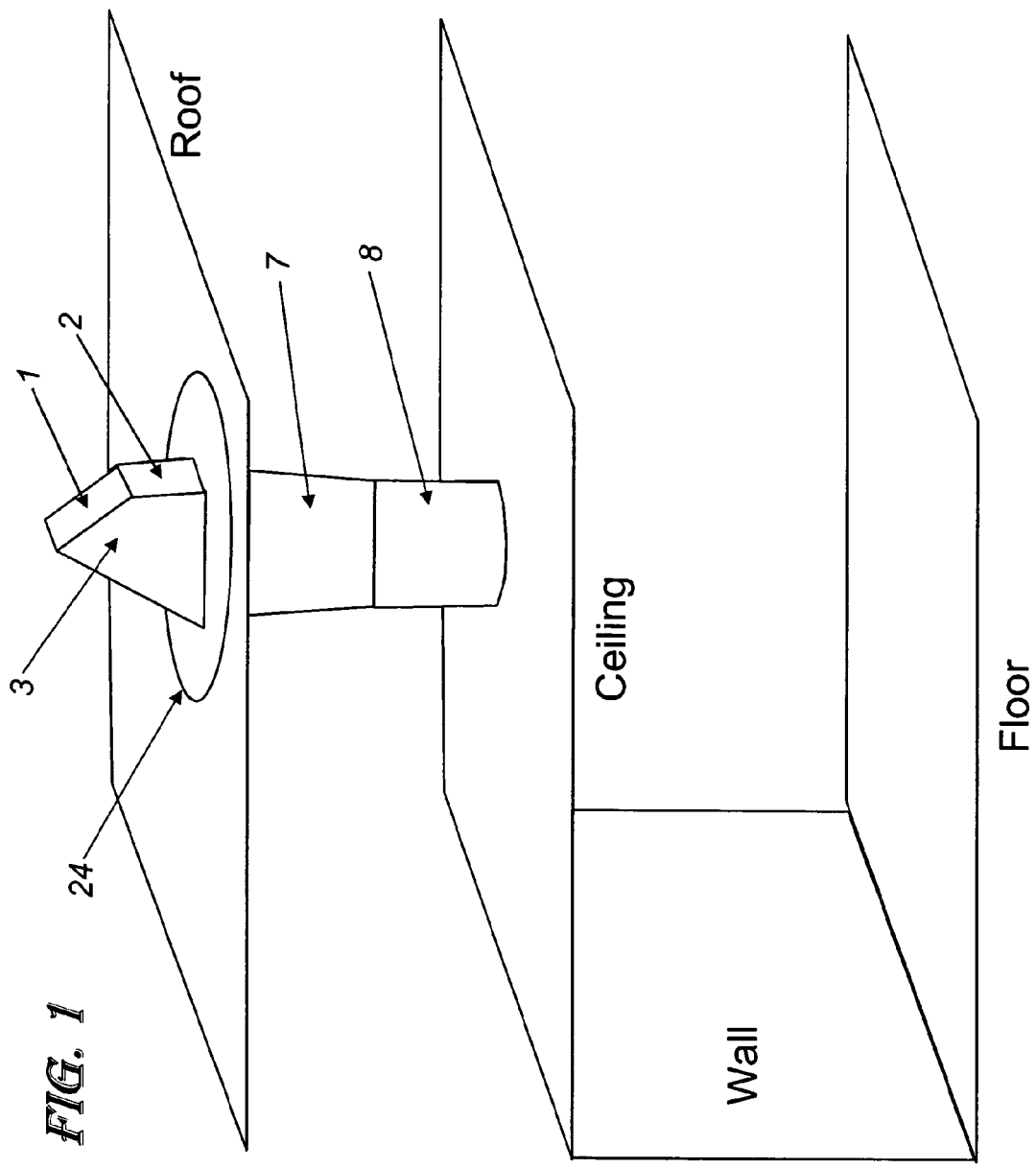
FIG. 1 is a basic configuration of the solar lighting system of the present invention.

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

1 upper back reflector
2 lower back reflector
3 single-axis opaque side walls
4 single axis tracking front glazing
5 single axis redirecting mirrors
6 back opaque housing
7 transition tube, rectangular-to-circular
8 cylindrical reflecting light pipe
9 redirecting reflecting faceted cone
10 lower redirecting reflecting ring
11 redirecting reflecting rings
12 transition tube housing
13 fluorescent tube
14 electric lighting luminaire
15 electronic dimming ballasts
16A single axis redirecting mirrors
16B single axis redirecting mirrors
17A single axis redirecting mirrors
17B single axis redirecting mirrors
18A single axis redirecting mirrors
18B single axis redirecting mirrors
19A upper two-axis transparent glazing
19B lower two-axis transparent glazing
20 two-axis opaque back housing
21 two-axis opaque side housings
22 two-axis adjustable tilt tracking mirror
23 mirror tracking mechanism
24 azimuthal tracking mechanism
25 cylindrical protective sleeve
26 primary mirror
27 mirror housing
28 vertical cylindrical structural
29 transition tube structural ring
30 roof flashing
31 equatorial tracking primary mirror
32 equatorial curved light pipe
33 mirror housing
34 plenum housing
35 equatorial rotating assembly
36 equatorial glazing
37 upper transparent housing
38 lower transparent housing
39 upper central bearing
40 lower central bearing
41 roof mount
42 transparent lower support
43 transparent lower bearing support
44 spoked lower support
45 spoked lower bearing mount
46 lower support
47 central axis
48 cylindrical housing w/base
49 cap
50 equatorial axis
51 equatorial bearings and drive
52 compliant weather seal
53 transparent thermal barrier
54 equatorial secondary mirror The method, system, apparatus and device of the present invention provides daylight illumination of a space below where it is placed in the roof and ceiling immediately above that space, such illumination being relatively constant over the course of a cloudless day. Electric lighting is used to supplement such daylight for periods when the sun is obscured by clouds and at night.

FIG. 1 illustrates the basic configuration of the direct beam solar lighting system. The upper reflector 1, lower reflector 2, and the sidewalls 3 of the solar collector constitute the rotating head or solar collection subsystem. The drive mechanism 24 is a carousel or "lazy Susan" bearing attached to a mounting surface on the roof of a building, where the roof may be either horizontal or sloped. The solar collector head is made to rotate so that the entrance aperture always faces the sun's azimuth. The transition tube 7 is a reflective tube having a cross-section at the top so as to mate with the bottom of the solar collection subsystem and a circular cross section at its bottom, where it mates to a cylindrical reflective light pipe 8 that delivers sunlight to a light fixture shown in FIGS. 6 and 11 in the ceiling below. The length of the light pipe 8 is adjusted before installation to match the needs of the particular building in which the invention is installed. Daylight emerges from the luminaire mounted in the ceiling in such a manner that most of it is reflected up to the ceiling and the upper portions of the walls enclosing the illuminated space.

Figure 2:
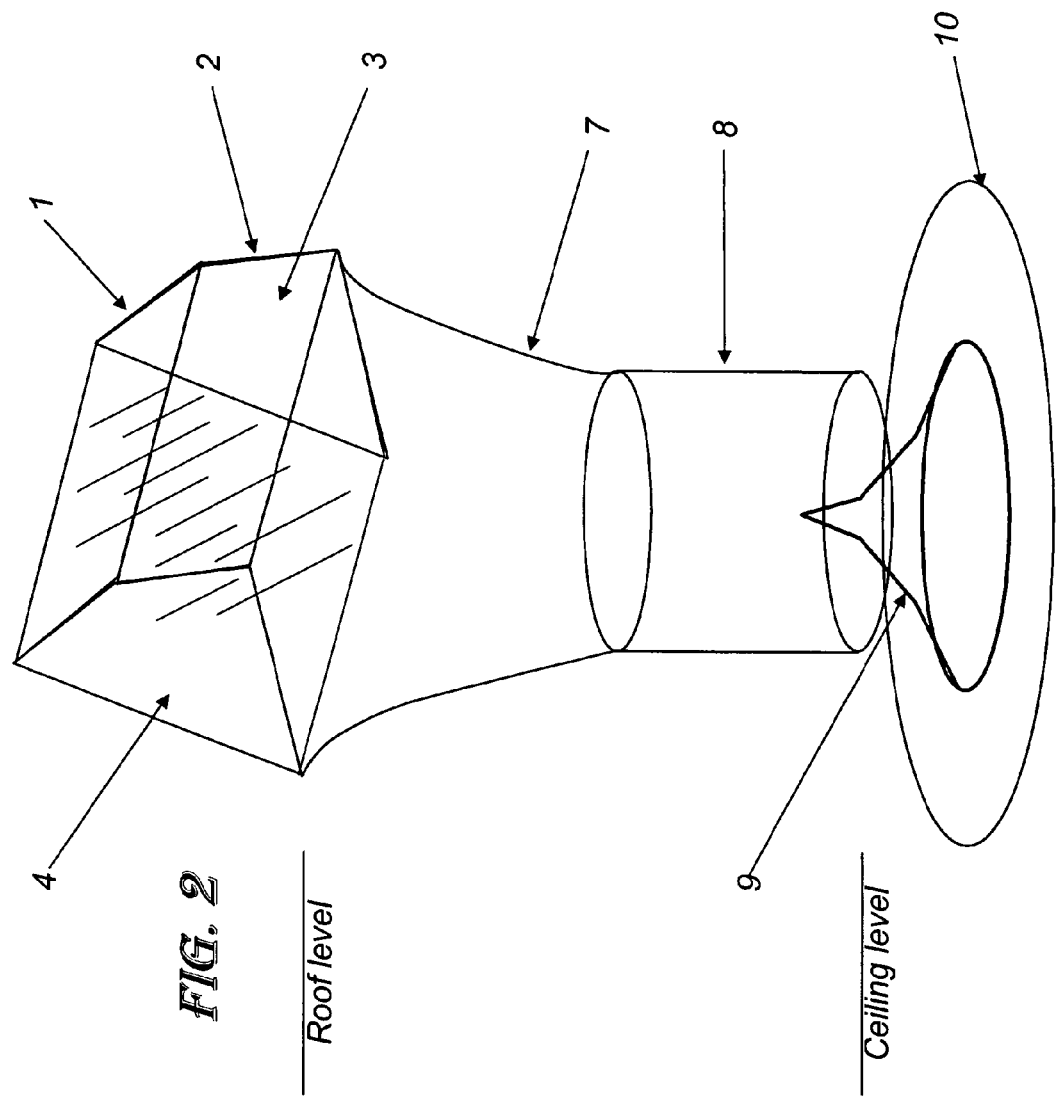
FIG. 2 is a perspective view of the solar lighting system of the present invention.

FIG. 2 illustrates the invention schematically. Light from the sun enters the glazed entrance aperture 4, reflects from the upper reflector 1 and lower reflector 2 down into the transition tube 7, where it is slightly concentrated and delivered into the reflective cylindrical light pipe 8. Light emerging from the light pipe 8 falls on the reflector 9 or lower redirecting reflector ring 10 which directs light onto a light-colored ceiling and walls, enabling it to be diffusely reflected to the space below. The interior surface of the upper back reflector 1, lower back reflector 2, and sides 3 of the sunlight collector are highly reflective, directing beam sunlight or diffused skylight reaching the reflective interior surfaces through the glazing 4 downward into the light collection and transfer system, transition tube 7 and light pipe 8. Sunlight emerging from the bottom of light pipe 8 strikes a faceted, segmented or smooth curved (with constant or varying radius of curvature) conical reflector 9, lower redirecting reflective ring 10, or redirecting reflective rings 11 and is redirected toward the ceiling and upper portion of the walls surrounding the illuminated space.

The circular reflective ring 10 at the base of the conical reflector 9 both shields the light emerging from the bottom of the light pipe 8 from view by room occupants, minimizing glare, and redirects solar flux reaching it upward onto the ceiling. The transition tube 7 rotates along with the solar collection head above it. The cylindrical light pipe 8 may either rotate with the transition tube or remain fixed in place, depending on the configuration desired. A light seal at the intersection of the fixed and moving circular apertures minimizes light losses into the attic or plenum space above the ceiling and prevents air flow through this crack.

Figure 3:
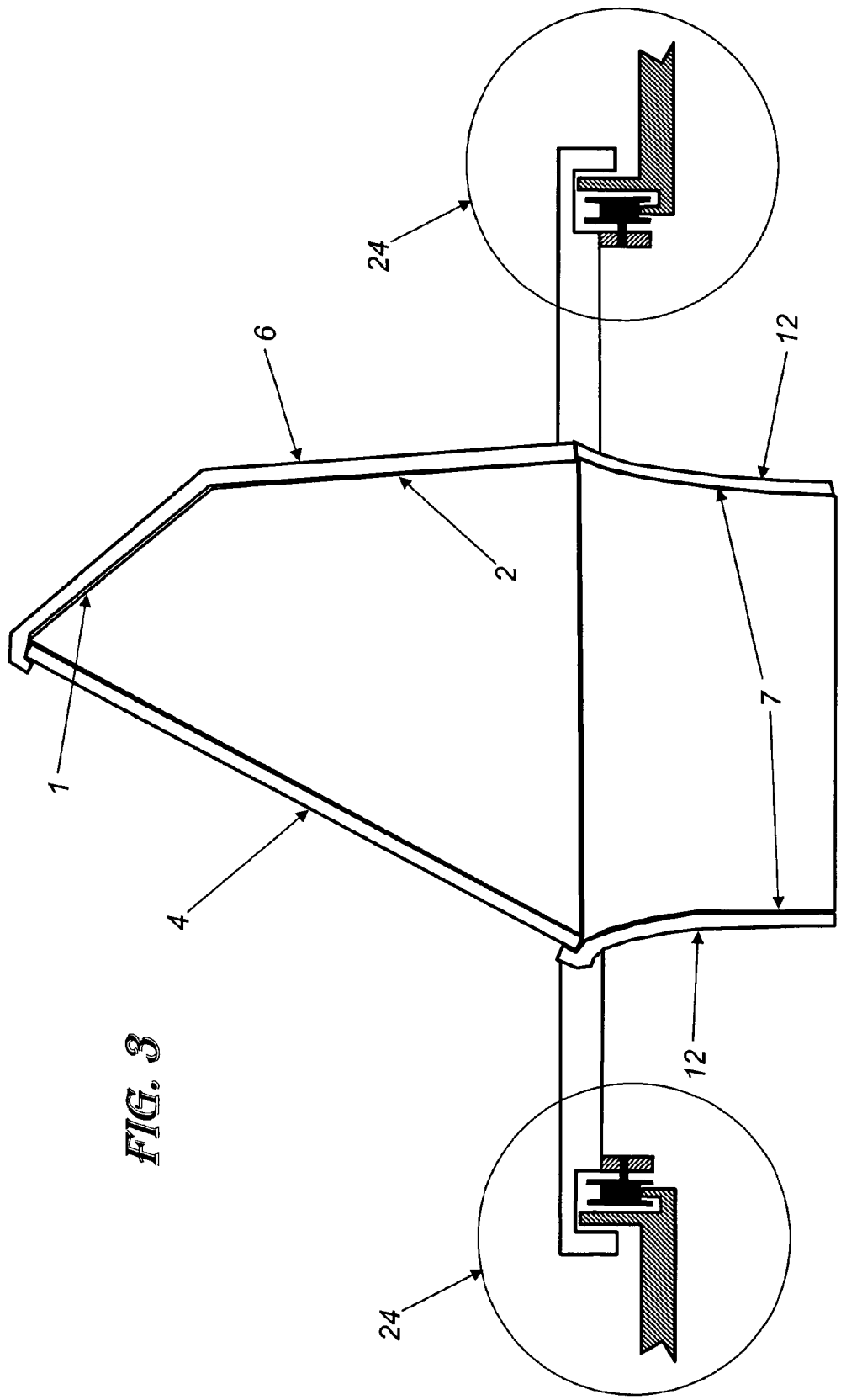
FIG. 3 is a side view of the top section of the solar collection device including the rotation mechanism.

A side view of the solar collection subsystem is illustrated in FIG. 3, which shows the housing 6 of the subsystem, to which the interior upper and lower reflectors 1 and 2 are affixed, and the housing 12 enclosing the reflective transition tube 7. A representative mechanism 24 for rotating the entire assembly is also illustrated. Any of several conventional embodiments of a rotating track and wheel or bearing support can be used to prevent rainwater, snow, etc. from entering the plenum space between roof and ceiling, while minimizing friction torque and electrical energy needed to rotate the solar collection subsystem. The design also minimizes losses of solar flux by maintaining the geometry of the reflective surfaces conducive to reflecting flux downward regardless of the relationship between the moving head and the fixed elements of the system.

The solar collector assembly is configured to rotate on this curbed or uncurbed track so that the glazed aperture 4 points toward the sun's azimuth, within a range of angles of permitted tolerance. With perfect tracking, a normal (perpendicular) vector to the plane of the entrance aperture 4 lies in the vertical plane through the center of the sun. Experimental observation indicates that with this design the tolerance on angular tracking of the sun's azimuth is not strict. The angles of inclination of top and bottom reflectors 1 and 2 and the glazed entrance aperture 4 are adjusted so that less intense light from the sun at low solar altitude angles is captured with good efficiency while the stronger flux from the sun at higher sun angles is partially attenuated, due to shading by the top reflector 1 (reducing the effective aperture area viewed from the sun), the goal being to provide illumination more uniformly over the course of the day as the sun rises, reaches its peak height, and sets.

Figure 6:
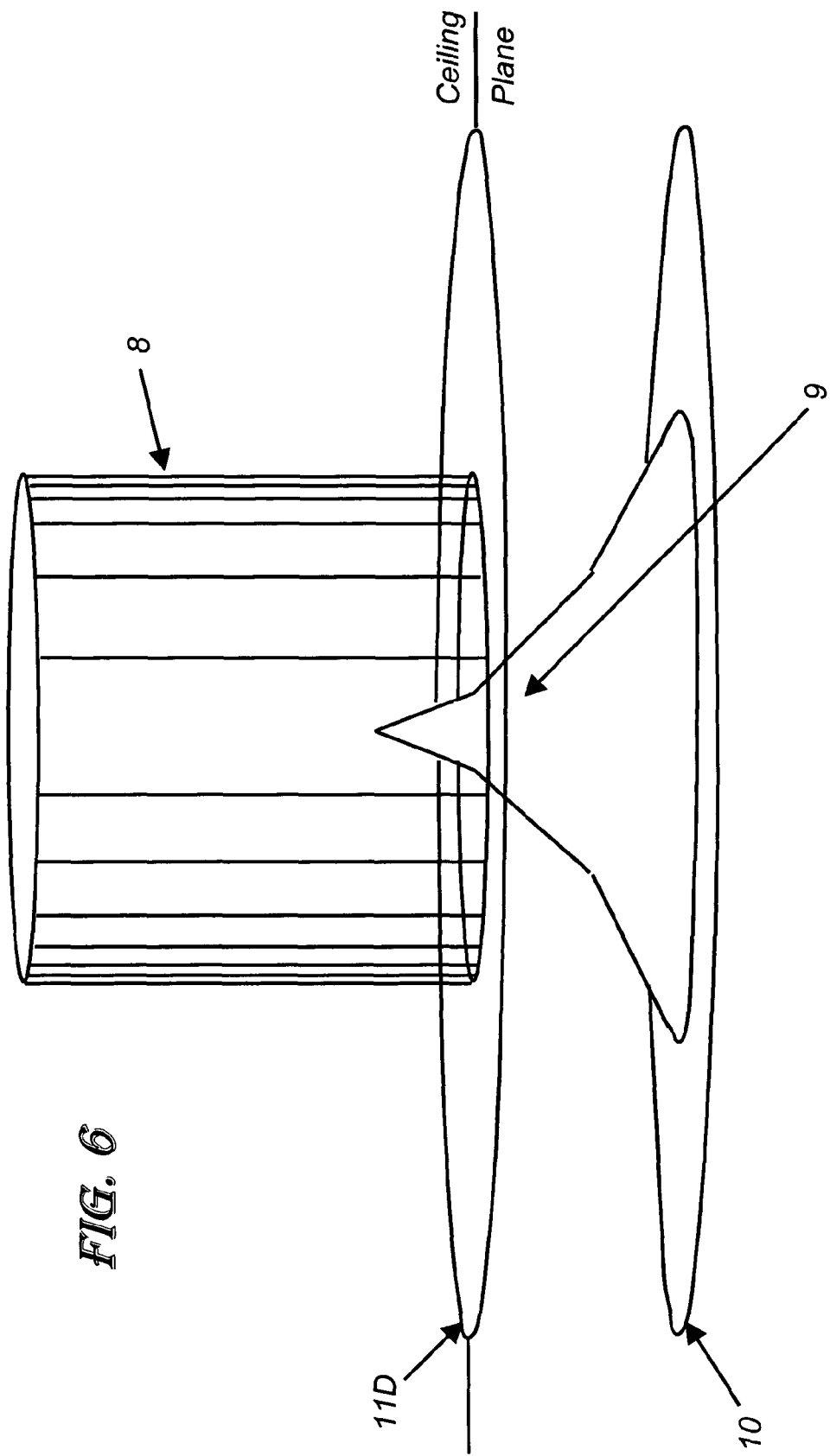
FIG. 6 is a perspective view of the light pipe and reflecting rings for installation of the solar light fixture in a ceiling.

As shown in FIG. 6, a luminaire, or light fixture, is placed at the bottom of the cylindrical light pipe 8 to redirect light emerging from this pipe up onto the ceiling. The luminaire is composed of curved, with constant or varying radius of curvature, faceted or segmented reflective cone 9, horizontal circular reflector 10, and ceiling circular reflecting ring 11D as shown in FIG. 6. Light rays emerging from the light pipe 8 strike various portions of reflective cone 9 and reflective ring 10 and are redirected laterally outward and upward onto the walls and ceiling of the room. The ceiling and walls are preferably coated with a diffusely reflecting material of high reflectivity. All reflective surfaces within the invention heretofore described are specularly reflecting, using the highest specular reflectivity material suitable for this purpose.

In the event that these specularly reflecting surfaces are imperfect in their shape or figure, producing nonuniform illumination of the ceiling and walls of the room, one or more of the reflecting surfaces may be given a semi-diffuse optical reflectivity such that the reflected flux is as strong as before, but is spread slightly from the specular direction, as a means to soften the occasional bright spots that may be evident in the reflected illumination.

For maximum energy conservation, the electric lights in the room are dimmed automatically whenever daylight from the invention is sufficient to illuminate the room. This dimming is adjusted to the minimum level necessary to obtain the desired average task plane illuminance over the space, thereby using the least amount of electric lighting energy practicable. The dimming may be accomplished electronically through the use of dimming ballasts or by switching off various banks of electric lights incrementally to maintain illumination levels desired. When daylight is sufficient, the electric lighting system is switched off completely. The electric lighting system may be incorporated into the current device or a separate unit.

Figure 7:
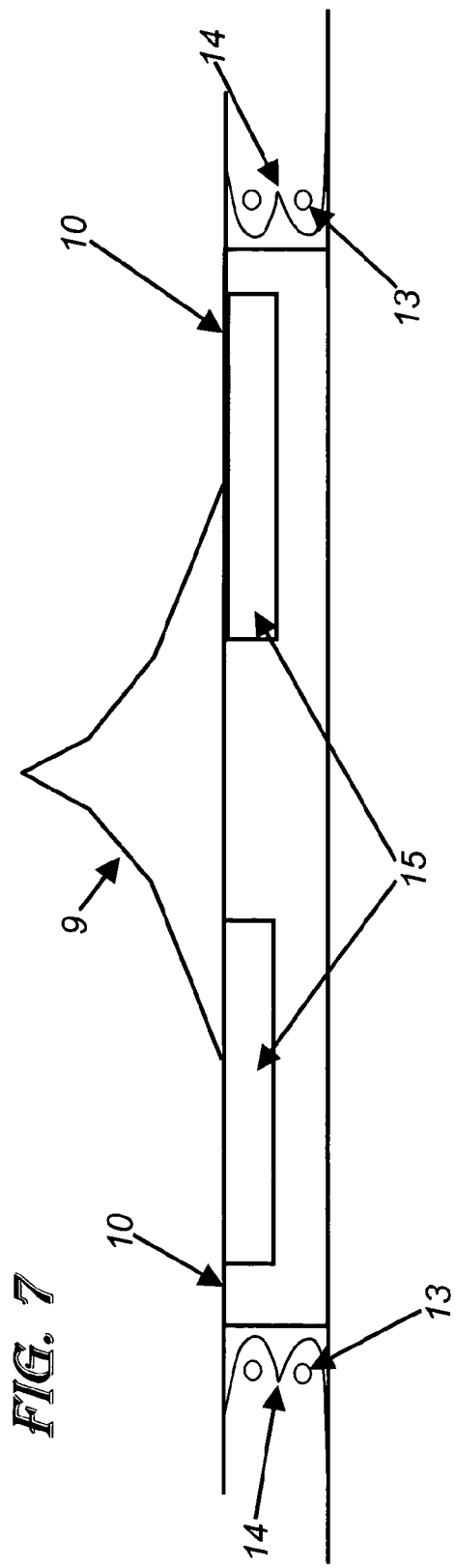
FIG. 7 is a side view showing one embodiment of how an electric luminaire can be incorporated with the solar lighting system of the present invention.

FIG. 7 indicates one possible way that an electric luminaire can be included in the design of the current invention. Flouorescent or other lamps 13 are placed around the perimeter and below the lower reflecting disk 19 and are surrounded by approximately parabolic reflectors 14. These reflectors direct light from the lamps radially outward to the walls and ceiling of the room. Fluorescent ballasts 15, if used, may be included in the housing of the invention, as shown in FIG. 7.

Figure 4:
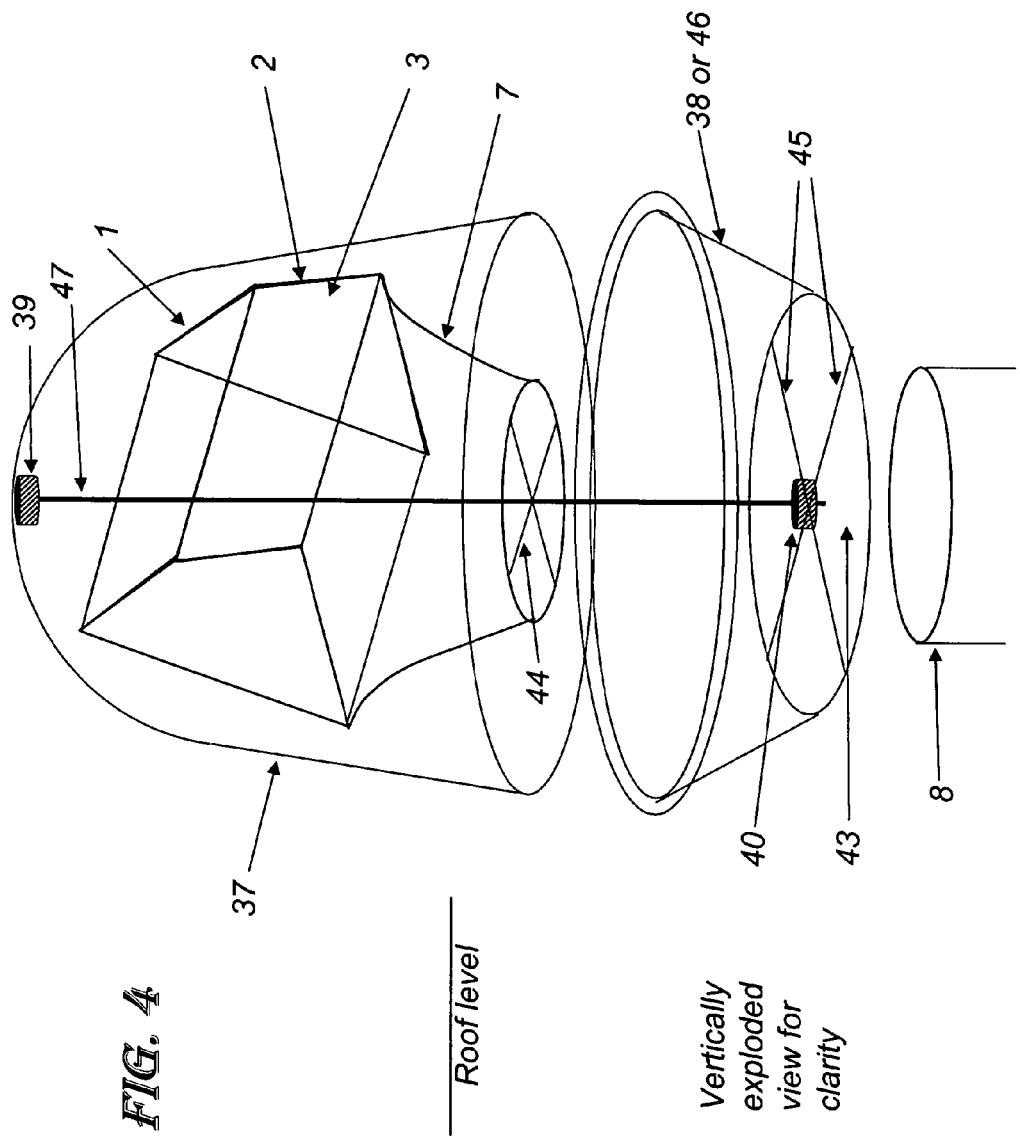
FIG. 4 shows a 3-dimensional perspective view of the solar collection device.
Figure 5:
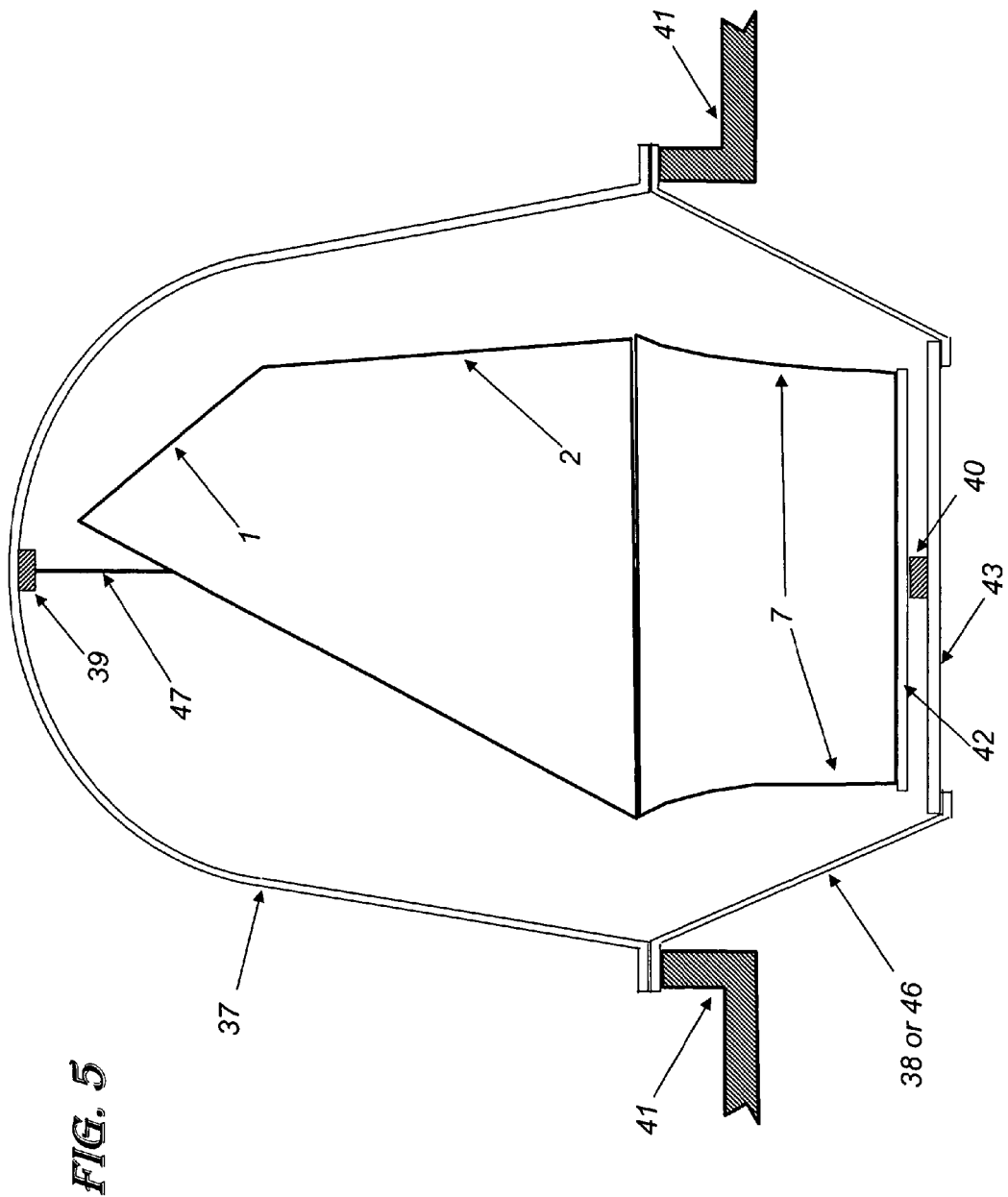
FIG. 5 is a side view of the top section of the solar collection device encapsulated within a fixed, non-rotating transparent housing and lower portion of the fixed housing.

Additional components, or modifications, may be added to the basic design previously described, for the purposes of improving performance or for customizing the invention to meet specific application requirements. FIGS. 4 and 5 illustrate an alternative configuration of the invention. FIG. 4 shows a 3-dimensional perspective view of the solar collection device encapsulated within a fixed, non-rotating transparent housing 37 and a lower portion of the fixed housing 38 or 46, the sides of which may be transparent 38 or not 46, and the optical collection and delivery subsystems including the upper and lower reflectors 1 and 2 and the transition tube 7. The bottom of rotating mechanism connects to the vertical axle 47 with either a set of spokes 44 or a transparent disk 42 (FIG. 5) and is supported by either transparent disk 43 or spoked wheel 45. The transparent lower bearing support 43 or the spoked lower bearing mount 45 shown in FIG. 5 is fixed and non-rotating and spoked lower support 44 or transparent lower support 42 rotates with the optical collection subsystem above it. Upper central bearing 39 and lower central bearing 40 are the bearings, bushings or other means of reducing friction supporting the rotating optical collection subsystem and driving its rotating motion.

The upper reflector 1, lower reflector 2, the sidewalls 3, and transition tube 7 of the solar collector constitute the rotating elements of the solar collection subsystem and are contained within a fixed transparent enclosure 37. The transparent enclosure 37 and the lower support 46 are held in position by the roof-mounted structure 41, where the roof may be either horizontal or sloped. The rotating elements are made to rotate so that the entrance aperture, a rectangular opening in the position occupied by glazing 4 in the previous embodiment but without the glazing in this alternative configuration faces the sun in azimuth.

The transition tube 7 is a reflective tube having a non-circular cross-section at the top where it mates to the bottom of the solar collection subsystem and a circular cross section at its bottom, where it aligns with a cylindrical reflective light pipe 8, if required, that delivers sunlight to a reflective cone 9 and lower redirecting reflective ring 10 in the ceiling below. The base of the transition tube is connected to the lower central axis 47 via either a sheet of transparent material 42 or a plurality of narrow spokes 44.

FIG. 5 shows a side view of the solar collection subsystem including the transparent enclosure 37 of the subsystem which supports the upper central bearing 39 to which the interior rotating reflectors 1 and 2 and reflective transition tube 7 are affixed via the central axis 47. The lower central support bearing 40 is supported by a transparent mounting plate 43 or a spoked wheel 45, to provide structural support with a maximum of light throughput. The upper and lower back reflectors 1 and 2 rest upon the transition tube 7 which in turn is mounted to a transparent lower bearing mount 42 or the spoked wheel 45, as required.

A perspective view of the solar collection system is illustrated in FIG. 4, which shows the use of a plurality of spokes 44 to replace the transparent mounting plate 42 and another plurality of spokes 45 in place of the transparent lower bearing mount 43.

FIG. 7 shows an alternative configuration that incorporates the room's electric lighting system with the solar lighting system of the present invention. For example, a second ring reflector 14 may be added. This second reflector ring 14 is planar on its outer rim, but curves upward in an approximately parabolic shape, providing redirecting reflectors to reflect light from the fluorescent tubes 13 of electric light fixture 14 outward onto the upper portions of the walls of the room and onto the ceiling. Electronic ballasts 15 are used to dim the light from the fluorescent lamps 13 when lighting from the solar lighting system is adequate, shutting off the electric light fixture 14 when light provided by the solar lighting system is sufficient to illuminate the room to the designated minimum level. Alternatively, one or more lamps are selectively turned on and off so that electric light supplementing available solar lighting can be varied step-wise from off through a number of steps to all lamps being full on.

Figure 8:
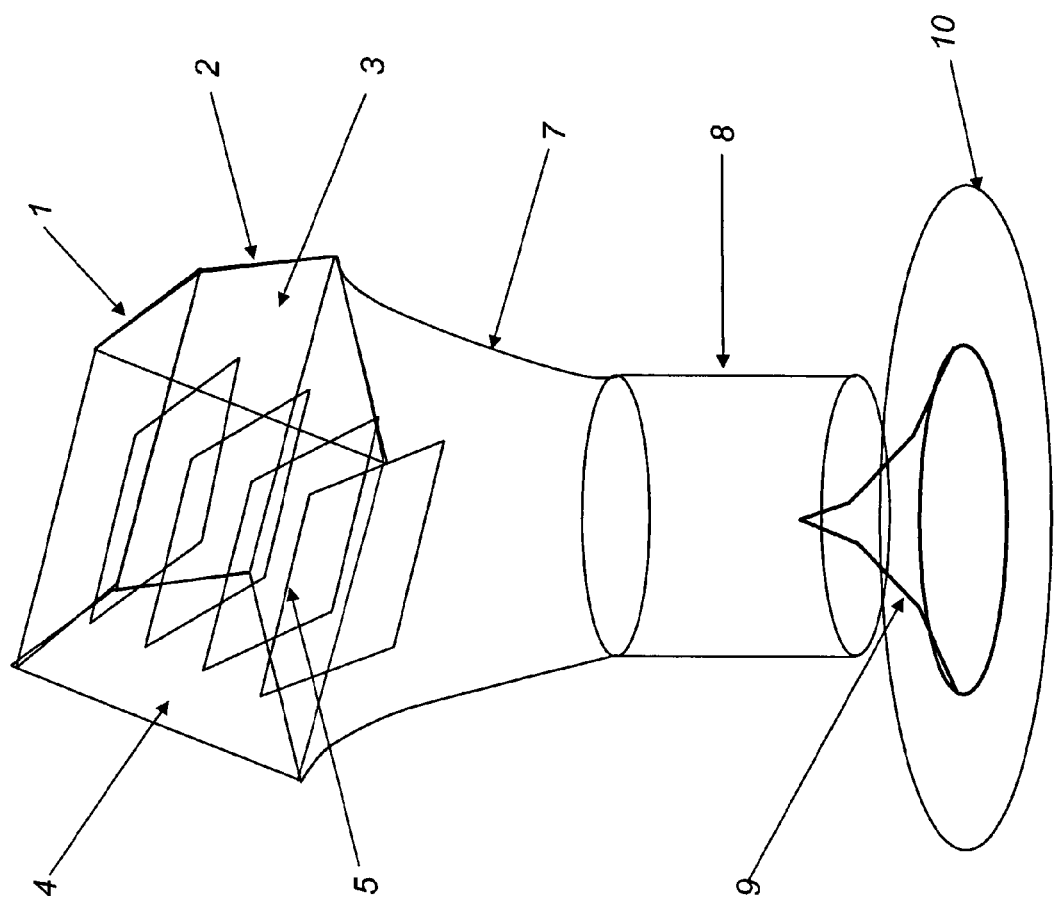
FIG. 8 shows the solar lighting system including reflective vanes in the solar collection assembly.
Figure 9:
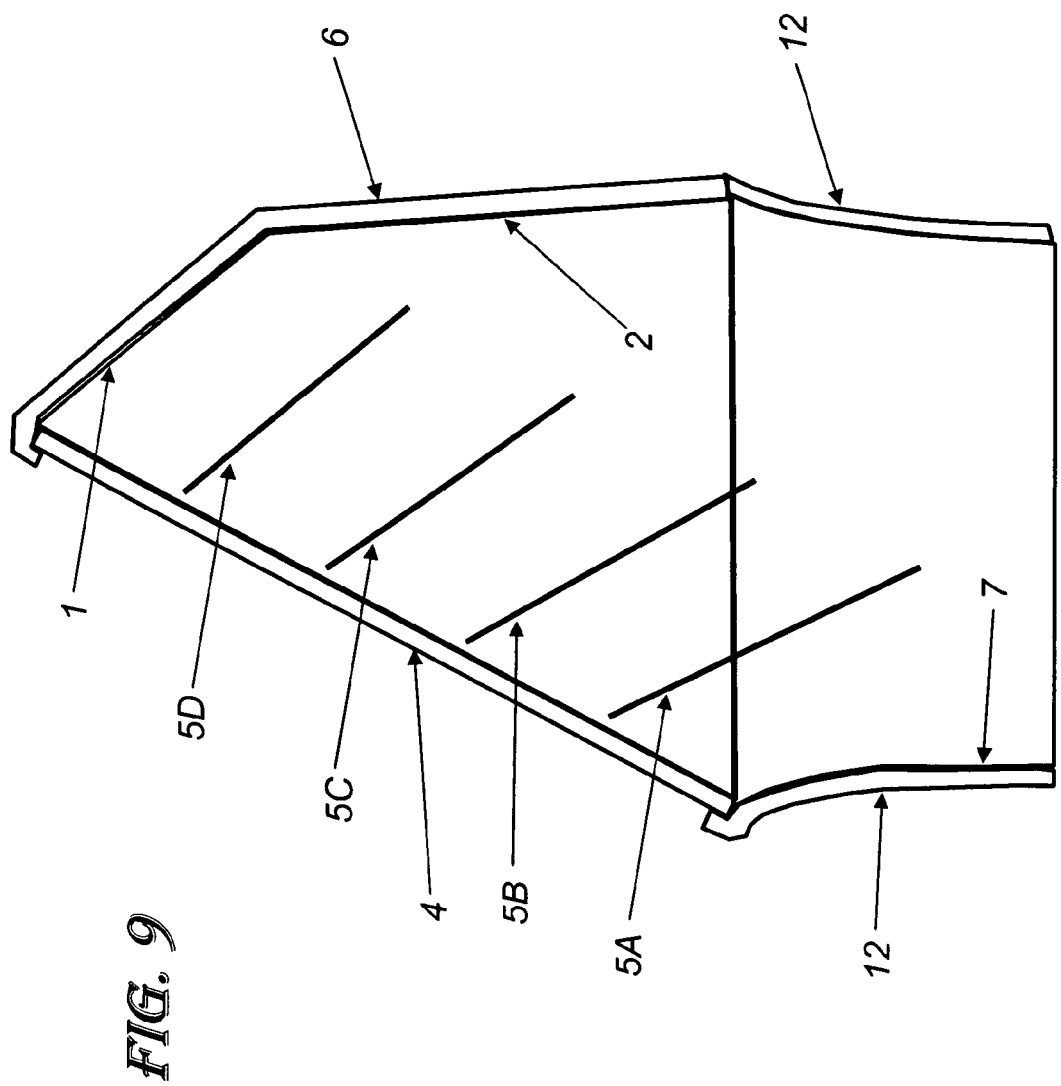
FIG. 9 is a side-view of the solar collection head, illustrating the placement the beam-homogenizing reflective vanes.

In order to ensure that for all sun angles, rays entering the solar collection assembly from the sun are directed downward onto all portions of the reflective cone 9 and reflective ring 10, reflective vanes 5 may be added to the solar collection assembly to redirect sunlight downward through the transition tube and light pipe more evenly over the retroreflector, reflective cone 9 and reflective ring 10. The positioning of these reflective vanes 5 is shown in FIG. 8. The angles of tilt of these reflective vanes are varied slightly from the bottom vane to the top vane and the width may be varied up to the diameter of the light pipe 8 below. Alternatively, the reflective vanes 5 may extend the full width of the solar collection head, being attached to the side walls 3 of the assembly. FIG. 9 is a side-view of the solar collection head, illustrating the placement of these beam-homogenizing reflective vanes 5A through 5D in more detail. The tilt angles shown are approximate.

Figure 10:
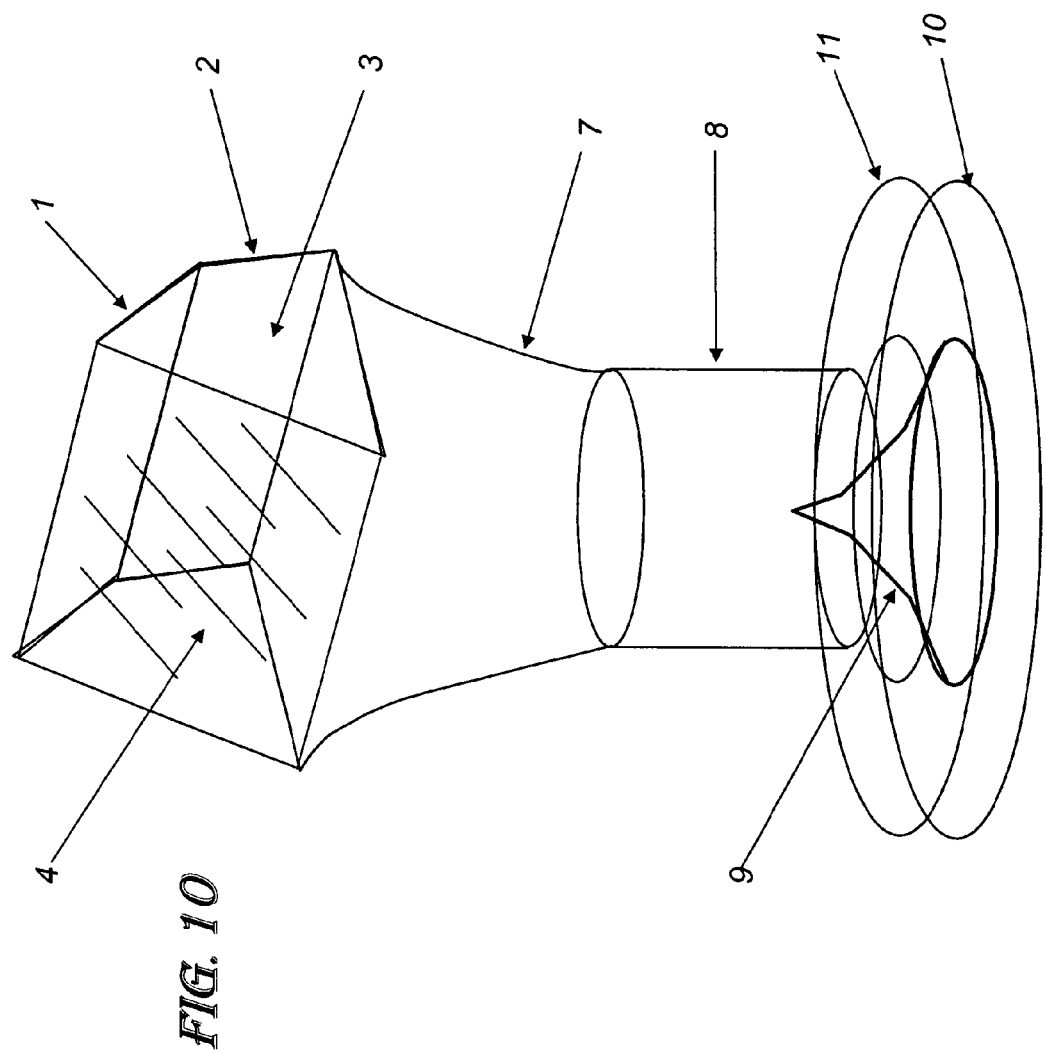
FIG. 10 shows the addition of reflecting rings as a glare prevention strategy.
Figure 11:
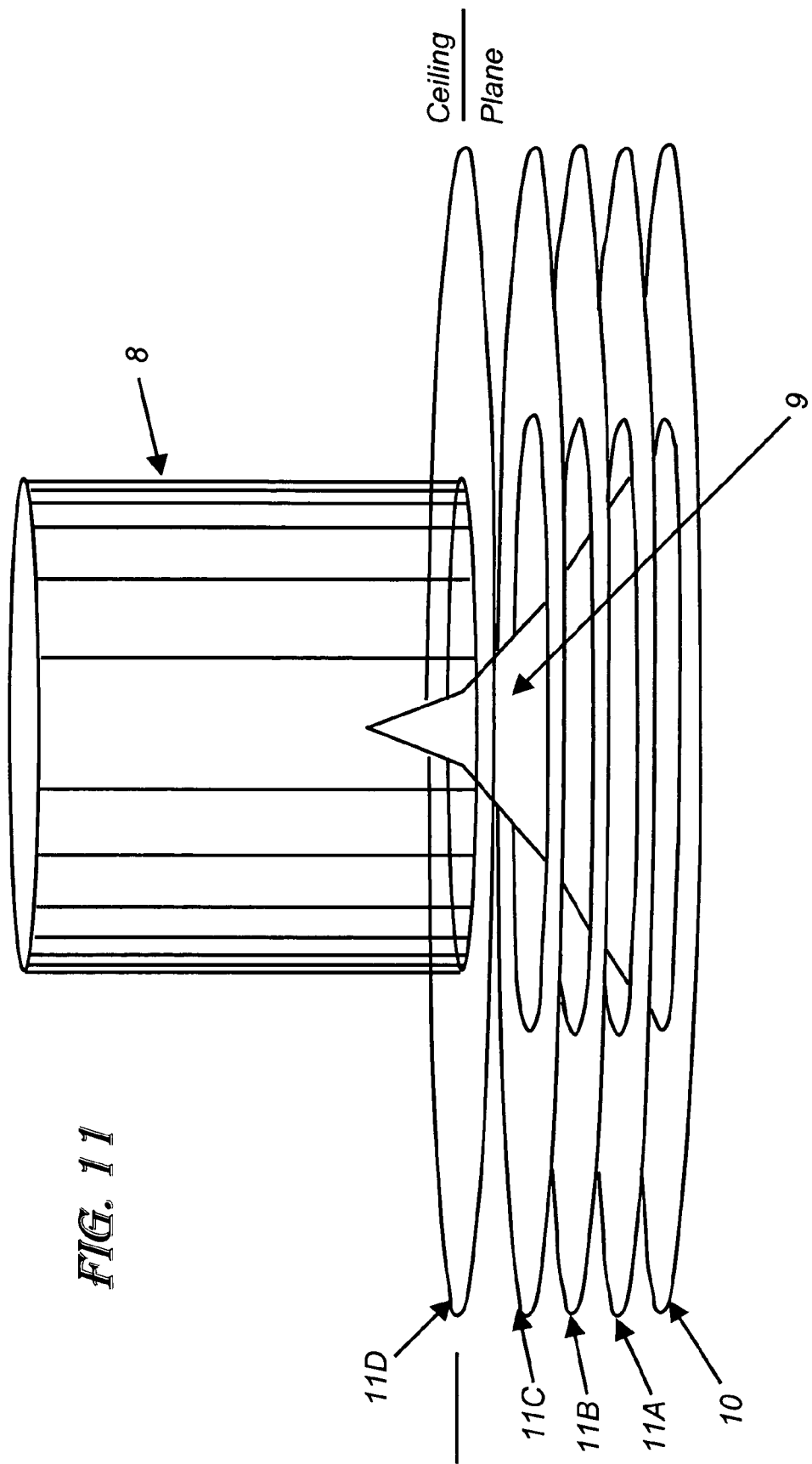
FIG. 11 is a view showing additional reflecting rings and the installation of the light pipe in a ceiling of a building.

FIGS. 10 and 11 illustrate another alternate configuration for reducing glare in the room due to light emerging from the bottom of light pipe 8, additional specular or combined specularly and diffusely reflecting planar, faceted, or curved with constant or varying radius of curvature, rings 11A through 11C may be placed between the lower reflector 10 and the ceiling reflector 11D, as shown. If more light is desired in the center of the illuminated space than around the perimeter of it, more diffuseness can be used in the reflecting properties of these rings, keeping light leaving the light pipe from propagating as far from the luminaire as would be the case with highly specular rings. A semi-diffuse reflecting property can also be helpful to soften the illumination of the room, reducing and spreading bright spots.

Figure 12:
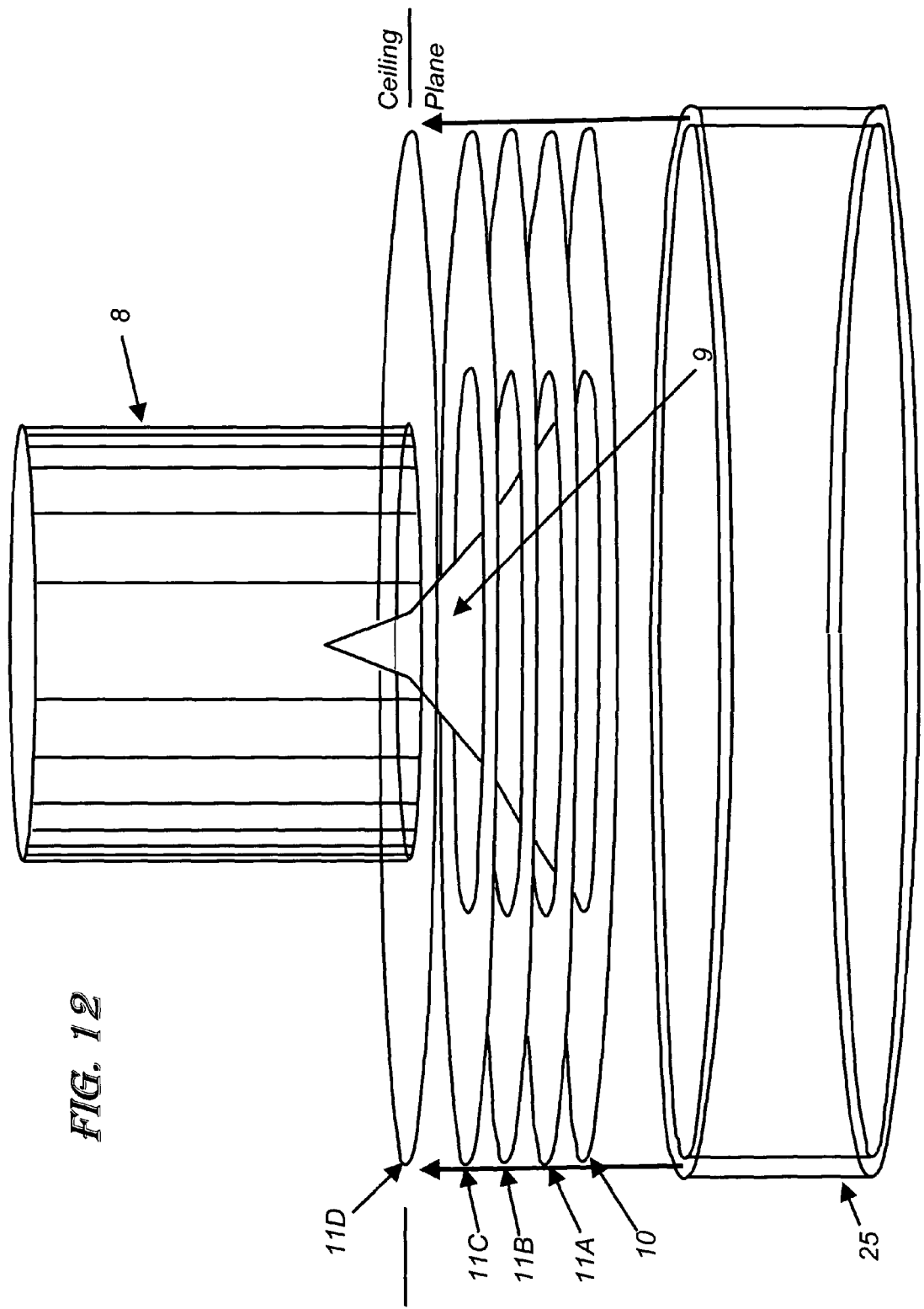
FIG. 12 is a side view showing the light pipe, the reflective rings, and how a transparent protective sleeve can be placed around the rings in a ceiling of a building.

In addition, an optional clear or slightly diffusely transmitting transparent cylinder, or sleeve 25 may be placed as shown around the outside of this stack of rings, extending from the bottom one 10 to the top one 11D on the ceiling, as shown in FIG. 12, to prevent the accumulation of dust or objects from being tossed into the luminaire from the room below. As shown in FIG. 12, the transparent ring 25 slides up over the edges of the lower reflective ring 10, and intermediate reflecting rings 11, if installed, as shown. Such a transparent cylinder 25 can also serve the purpose of softening or dispersing the daylight emerging from the luminaire toward the walls and ceiling of the room.

Figure 13:
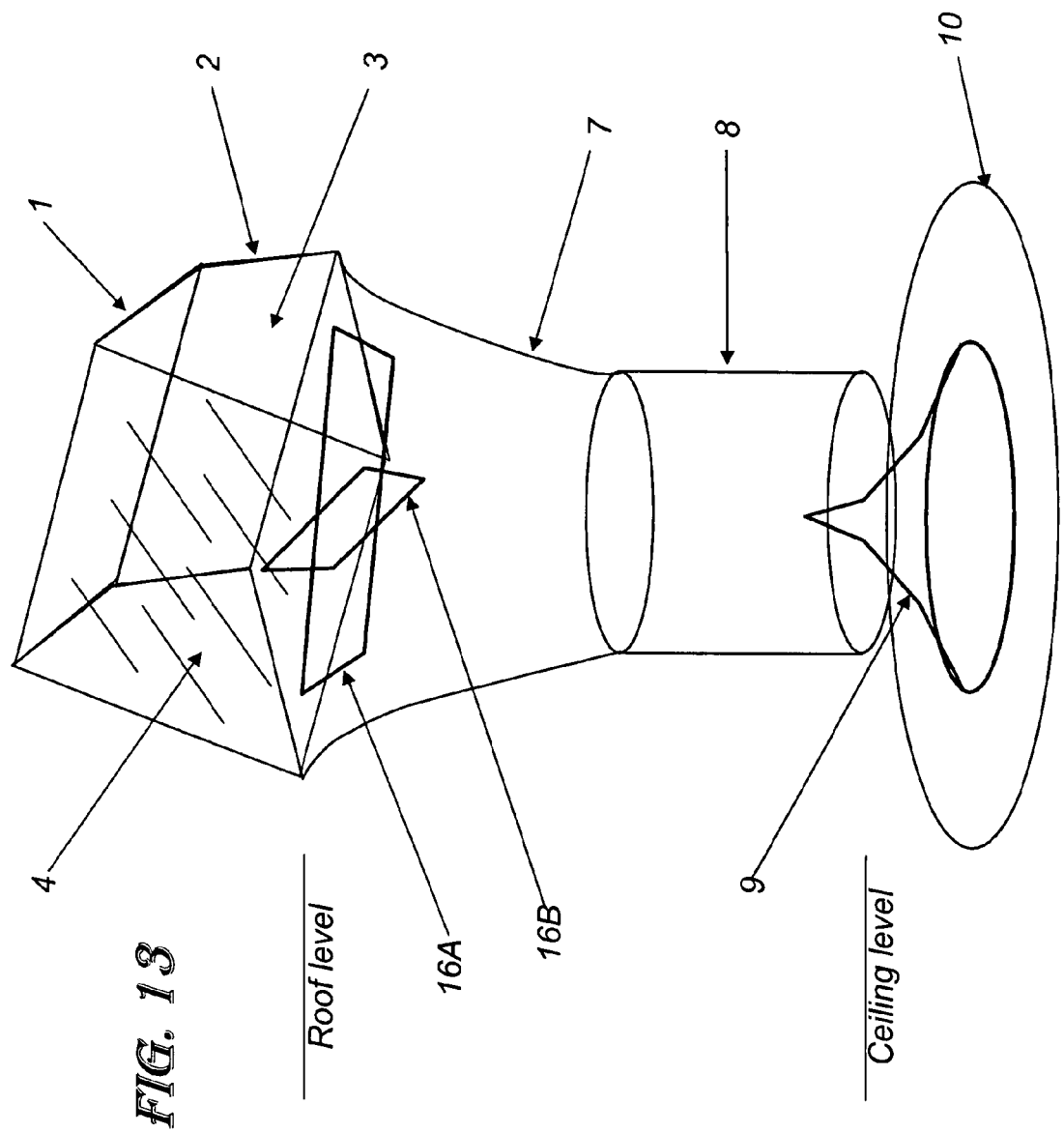
FIG. 13 shows the solar lighting system incorporating crossed reflective beam homogenizing vanes.
Figure 14:
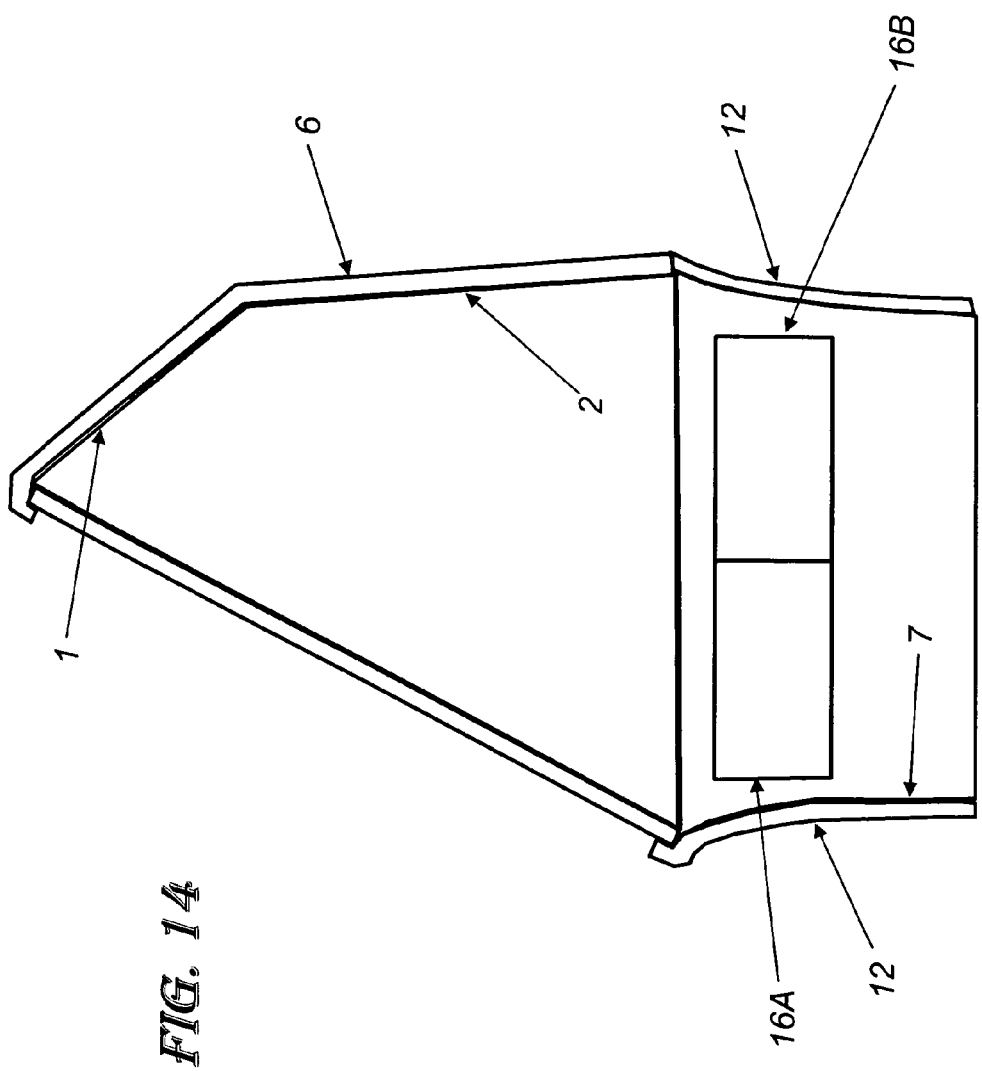
FIG. 14 is a side view of the solar lighting system of FIG. 13.

FIGS. 13 and 14 illustrate another means of homogenizing the sun's rays following reflection from upper and lower reflectors 1 and 2, respectively. This configuration consists of crossed reflective vanes 16A and 16B placed in the transition tube 7 or further down the light pipe 8. Additional vanes may also be added to this configuration to alter or improve performance. The length of the reflective vanes 16A and 16B can vary up to the length of the transition tube 7 or light pipe 8, whichever they are mounted in.

Figure 15:
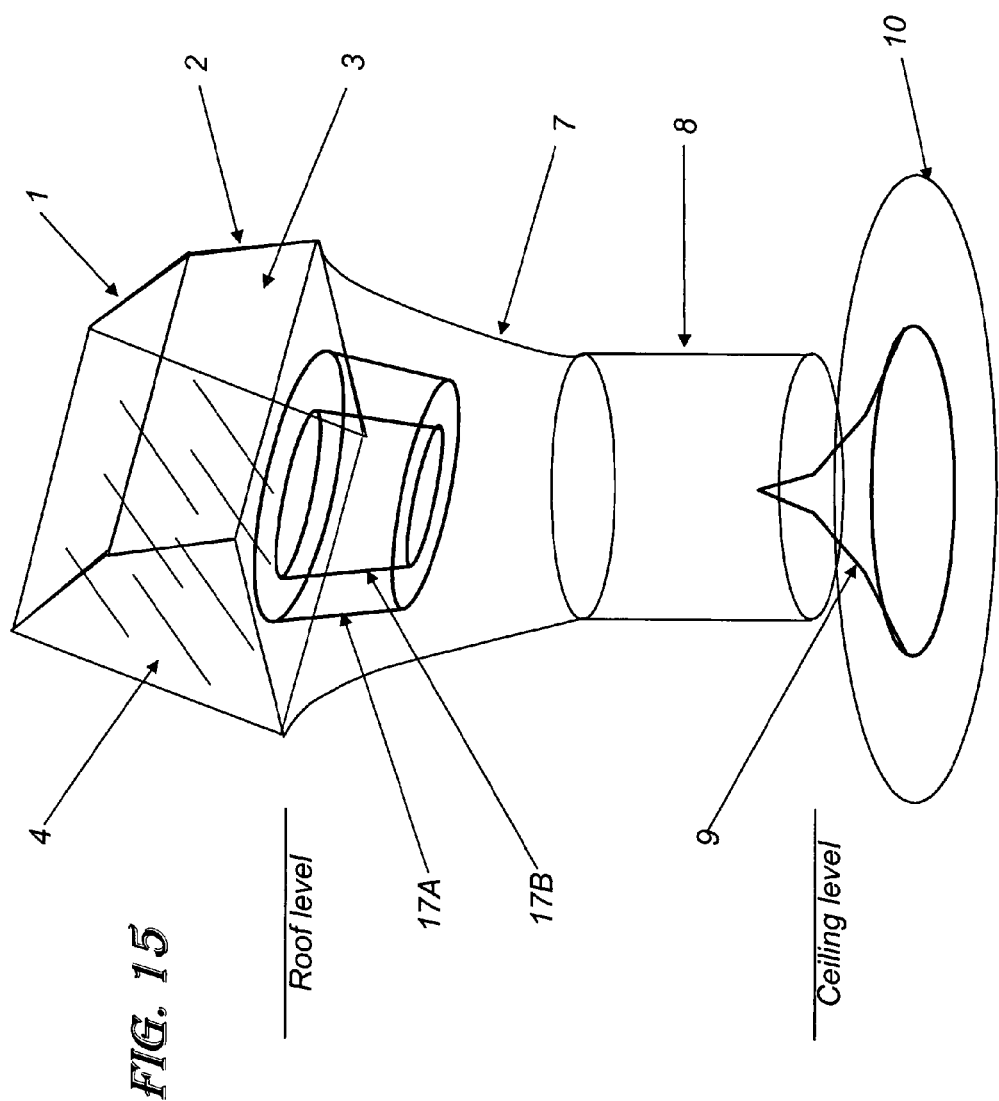
FIG. 15 shows the solar lighting system incorporating curved or rounded beam homogenizing reflective vanes.
Figure 16:
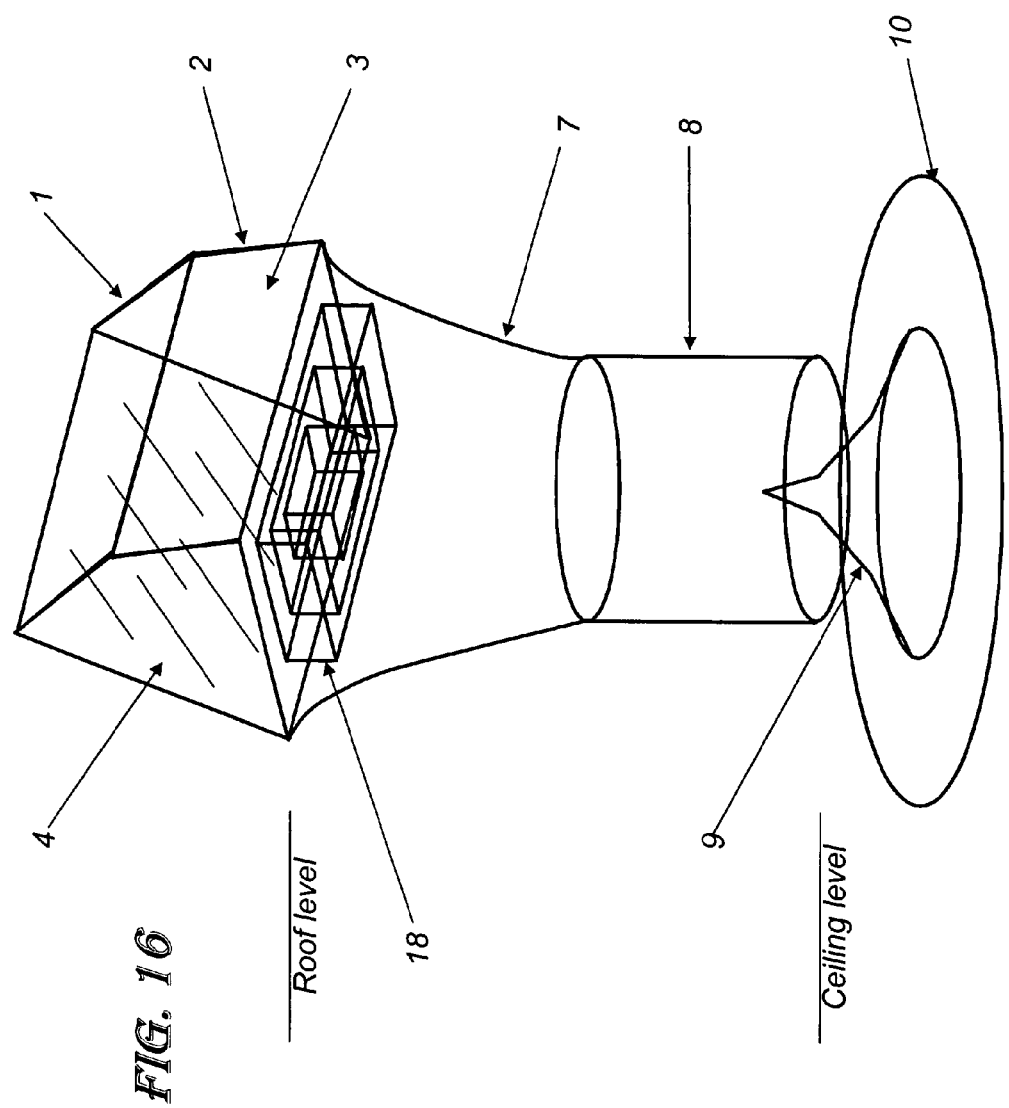
FIG. 16 shows a rectangular variation of the beam homogenizer shown in FIG. 15.

Still another method for homogenizing the beam is shown in FIG. 15. Concentric cylindrical, elliptical, or otherwise oval or tapered reflective surfaces 17 may be placed inside of the transition tube 7 or light pipe 8, for reflecting angled rays reaching them more uniformly over the luminaire surfaces below. A rectangular variation on the curved beam homogenizer shown in FIG. 15 is illustrated in FIG. 16. Open rectangular boxes 18 made of highly reflective material are suspended within the transition tube 7, or light pipe 8. In all configurations the vanes, cylinders, elliptical, square, or rectangular devices used to homogenize the light beam may be of constant or varying cross section and may be of flat, faceted, curved (of constant or varying radius of curvature) surfaces.

Figure 17:
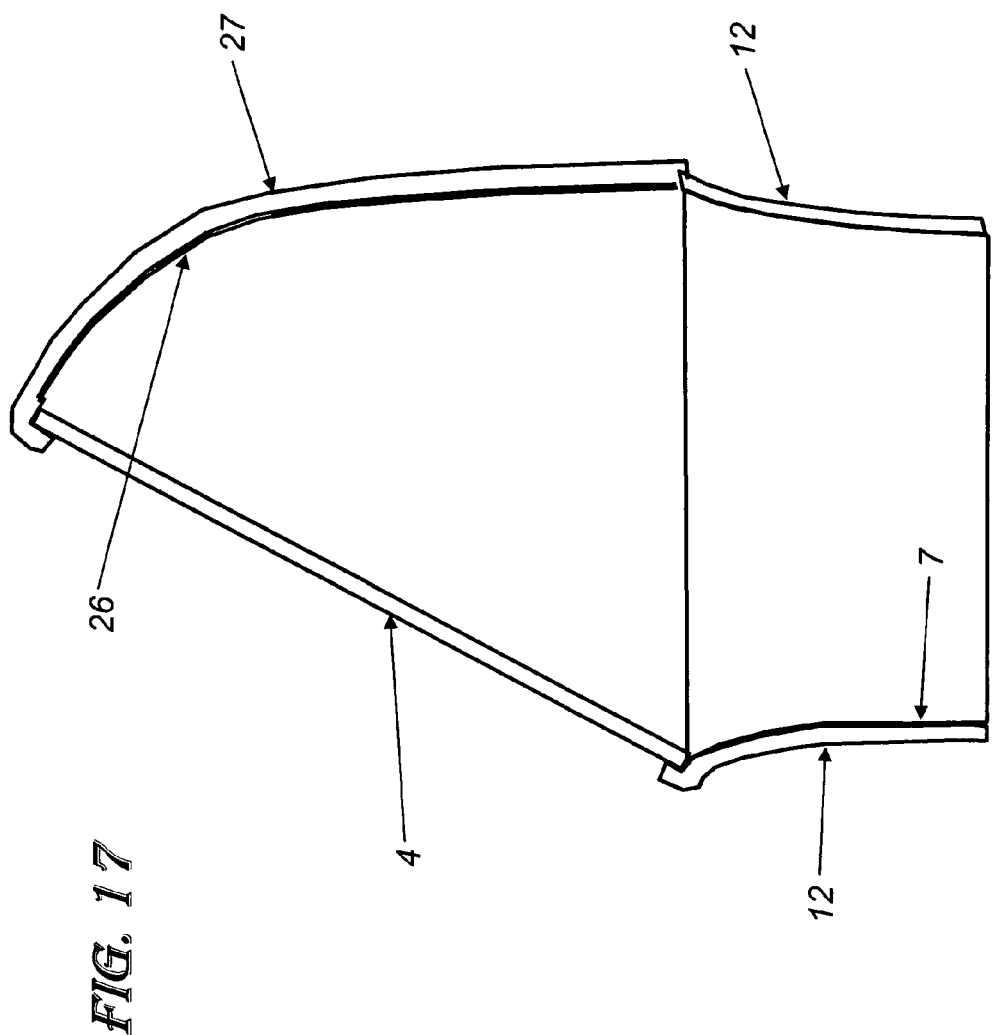
FIG. 17 is a side view showing a curved reflective mirror 26 in the solar collection assembly.

In the configuration shown in FIG. 17, the planar upper and lower reflectors 1 and 2 shown and previously described, are replaced by a faceted or curved reflector 26 on the inside of a faceted or curved housing 27 that better conforms to the shape of the reflectors 26.

Several companies manufacture and market tubular daylighting devices in the United States and abroad. They include Solatube, ODL, Natural Light, and Velux. Most of them use a clear dome at the top of a vertical cylindrical reflective light pipe that projects above the roof plane, extends downward through the roof and attic or plenum space to the ceiling of the room below. A diffusing glazing, planar or domed, is affixed to the bottom of the light pipe at the ceiling level, thereby spreading the light received by it over the room area beneath the diffuser. Some of these products incorporate reflectors or refracting elements in the design of the top dome (or placed just below it) to improve early morning or late afternoon performance, but with very modest, if any, improvement.

Figure 18:
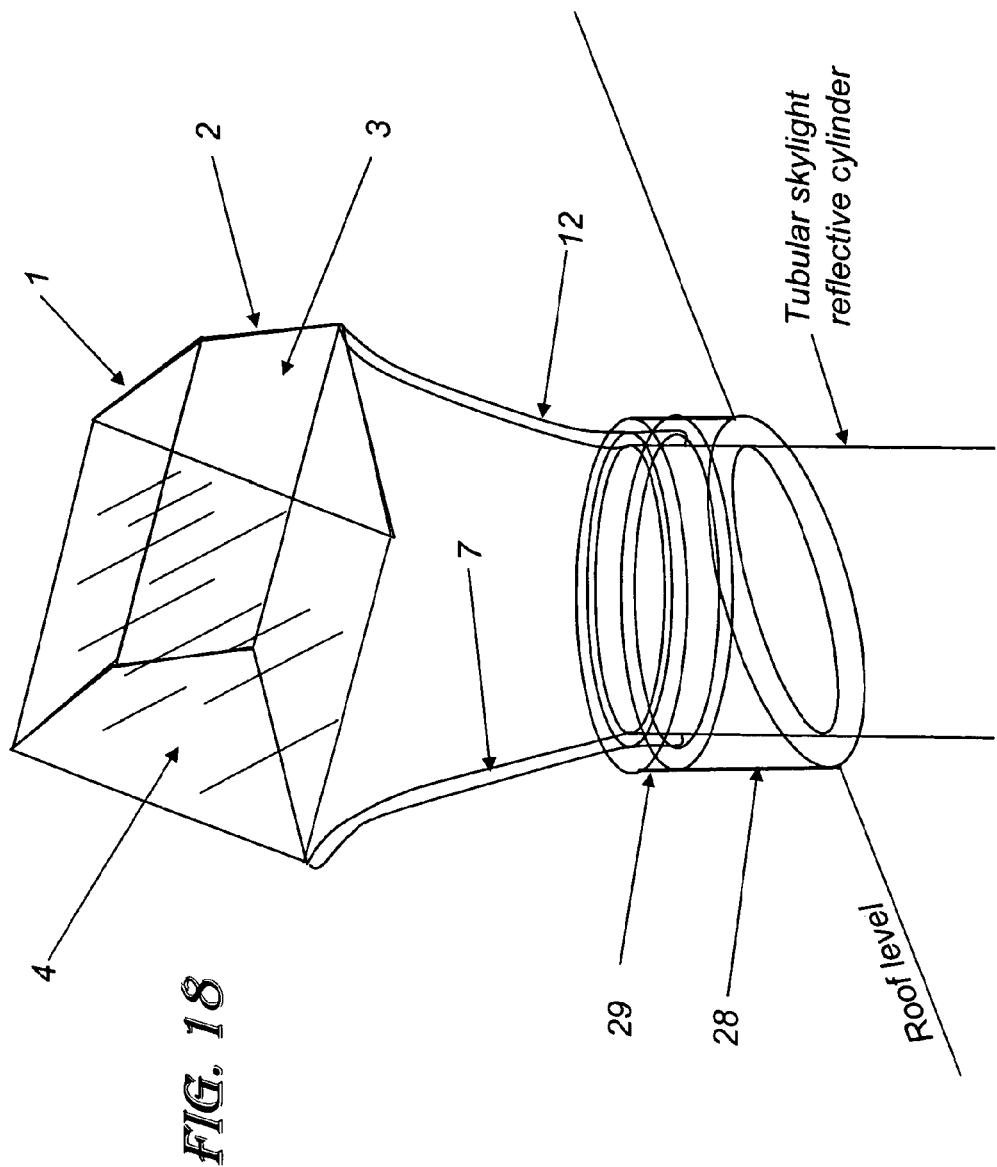
FIG. 18 shows installation of the solar lighting system with a tubular skylight reflective cylinder.
Figure 19:
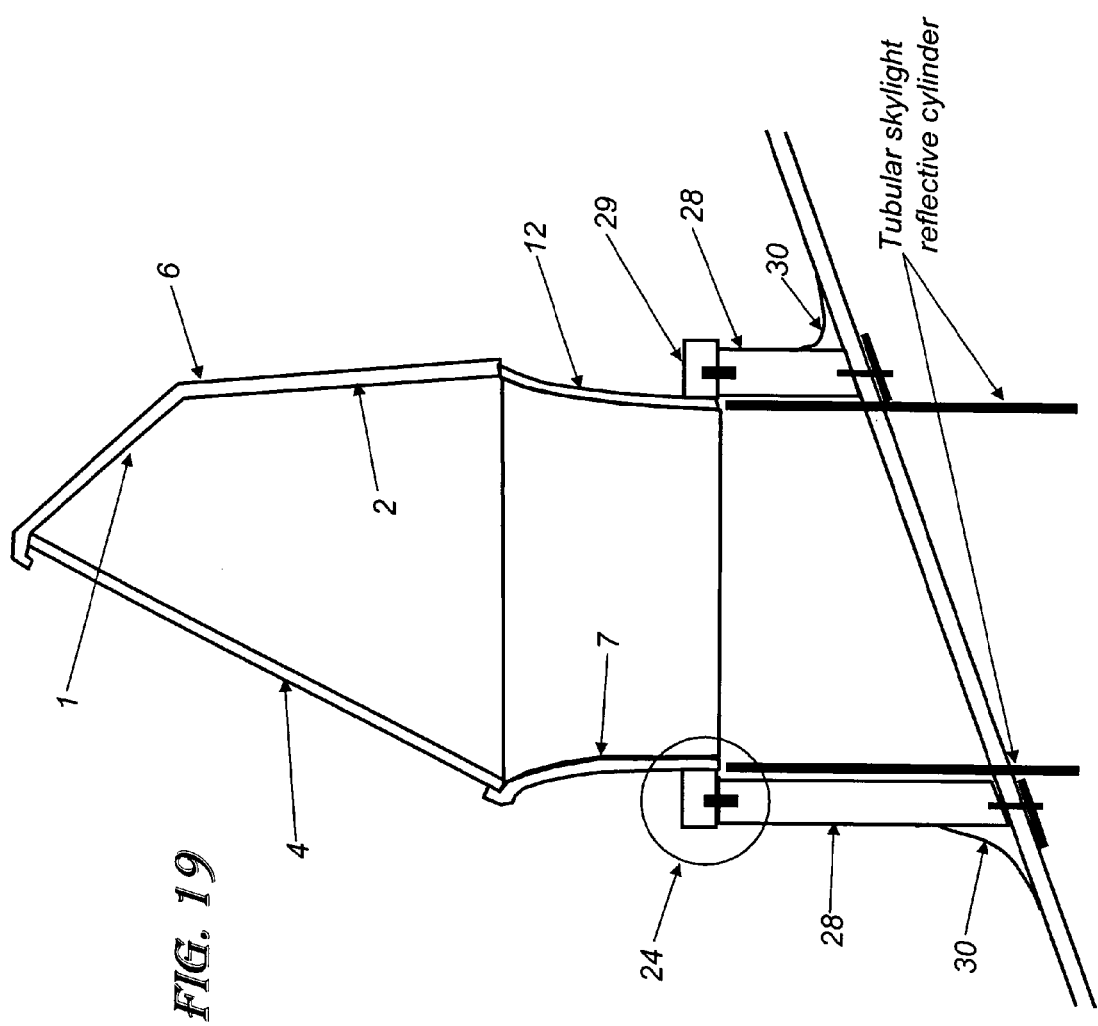
FIG. 19 is a side view showing installation of the solar lighting system with a tubular skylight reflective cylinder on a roof of a building, providing more mounting details.

In this configuration, the top dome and associated optical elements of a commercially available tubular skylight are removed, leaving the reflective cylindrical light pipe protruding up from the roof. A support sleeve 28 is placed over the cylindrical light pipe and mounted firmly to the roof of the building. A smaller version of the solar collection and tracking head, including upper and lower back reflectors 1 and 2, opaque side walls 3, and/or transition tube 7 is placed on top of sleeve 28, using mounting ring 29 attached firmly to the transition tube housing 12. Sleeve 28 is mounted firmly to the roof surface and at its bottom and supports the rotating head, upper and lower back reflectors 1 and 2, opaque side walls 3, front glazing 4, back opaque housing 6, transition tube 7, and transition tube housing 12, as shown in FIGS. 18 and 19. Ring 29 is firmly affixed to the bottom of the transition tube housing 12 and contains the mechanism 24 that rotates (in azimuth only) the solar collector head above, to track the sun's movement. The rotating mechanism 24 in FIG. 19 is similar in function to mechanism 24 shown in FIG. 3.

Transition tube housing 12 surrounding the transition tube 7 may be strengthened in this version of the invention so that it supports itself and the solar collection assembly component's upper and lower reflectors 1 and 2, respectively, side walls 3, glazed entrance aperture 4, and the back housing 6 described above, with sufficient strength to withstand expected wind loading forces. A motor for driving the rotation is powered by the electric grid or a small photovoltaic (PV) cell array and associated elements of a PV-powered system, such as large capacitor, batteries, and associated charging circuits, and voltage regulators, or other source of electricity.

FIG. 19 provides a side view schematic illustration of this fifth embodiment of the invention. The base of the sleeve 28 fitting over a tubular skylight reflective cylinder is sealed to the roof through the use of roof flashing 30, using any of a variety of flashing techniques commonly known to roofing technicians. If needed and used, sleeve 28 is made of material strong enough to support the solar collection head and its rotating mechanism as well as to hold it tightly to the building in the event of high winds. This modification enhances the performance of the tubular skylight by increasing illumination levels at all sun angles, but preferentially more at low sun angles, making the light level in the space below more uniform throughout the day. With its larger solar collection aperture 4, tracking ability, and other design features, the added tracking head delivers more light to the light pipe 8 and improves the tubular skylight performance all day long.

Figure 20:
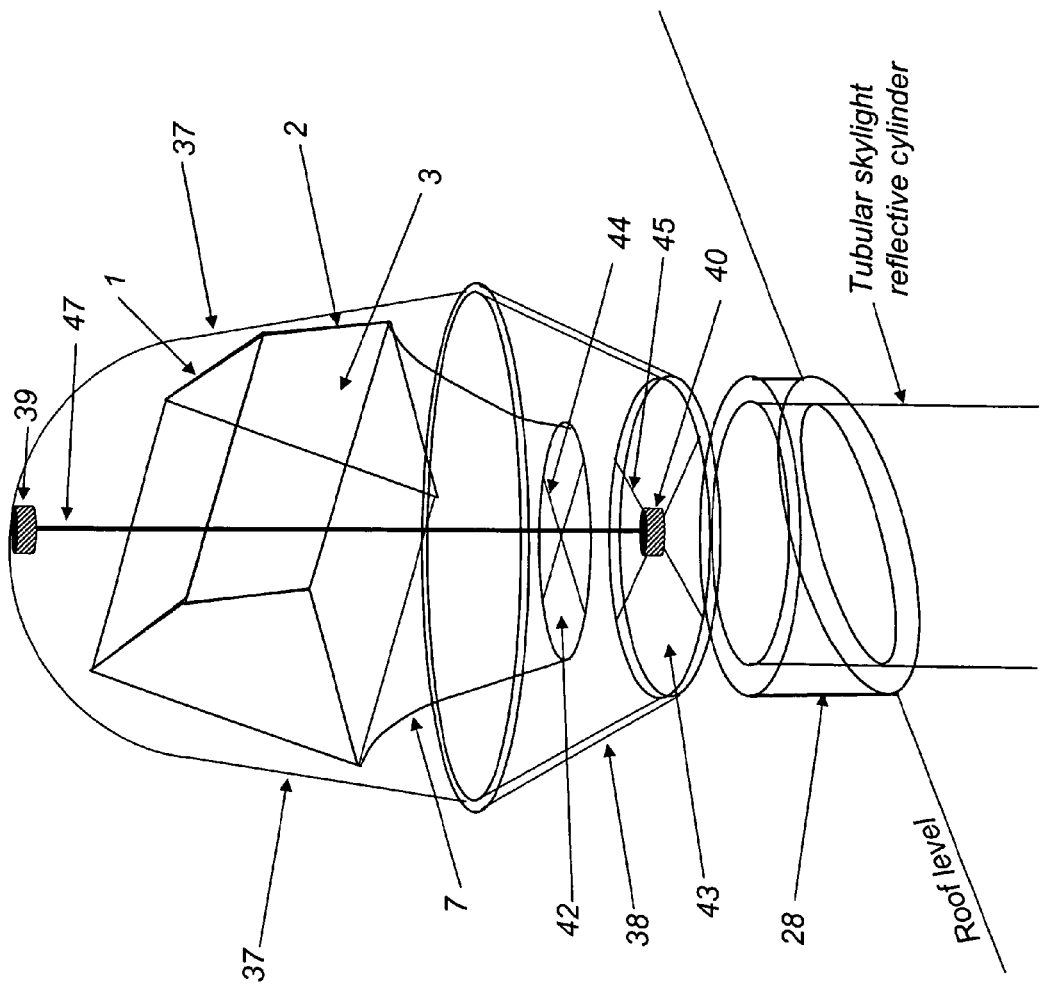
FIG. 20 shows installation of the transparent encapsulating housing version of the solar lighting system of the present invention in conjunction with a tubular skylight reflective cylinder on a roof of a building.
Figure 21:
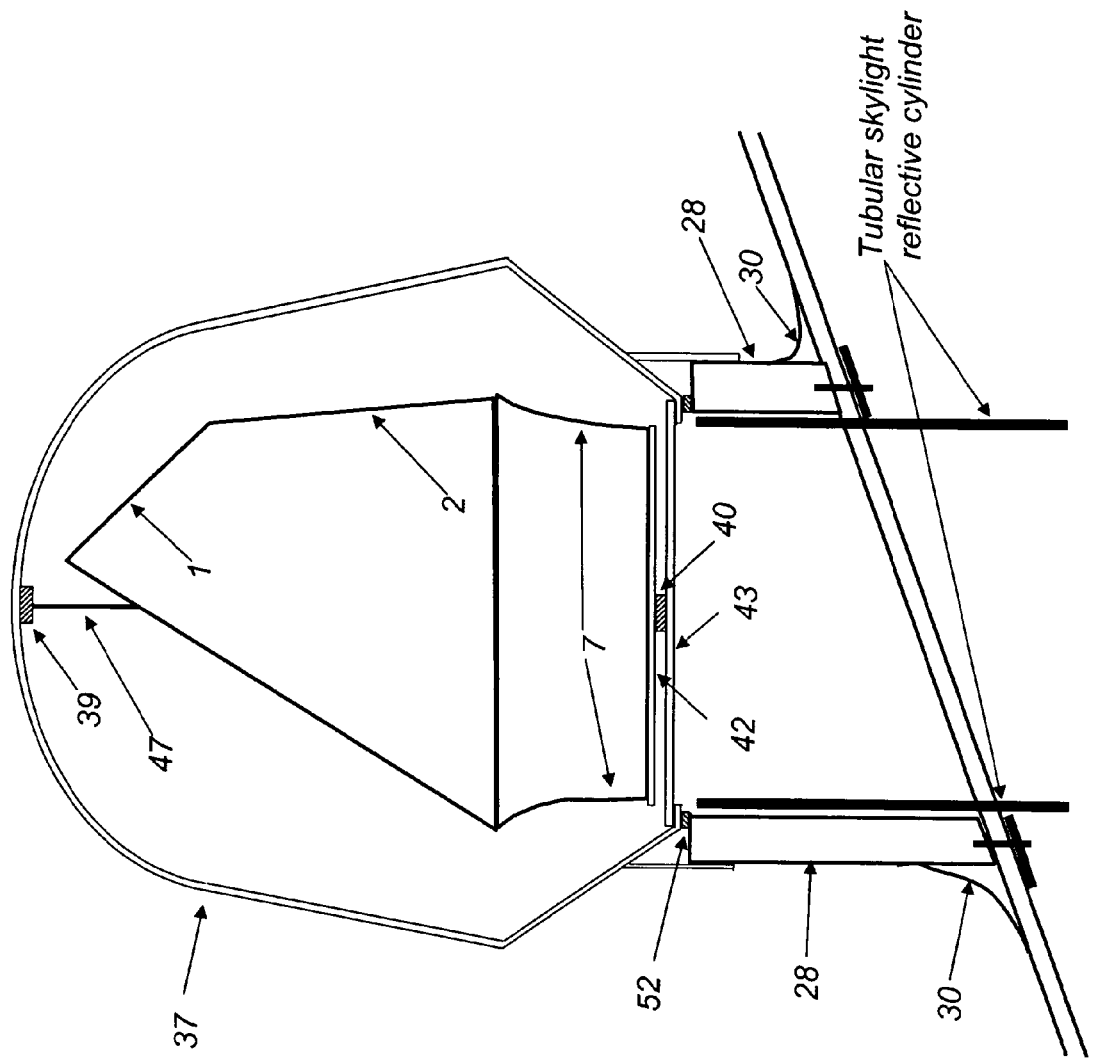
FIG. 21 is a side view showing installation of the encapsulated version of the solar lighting system in conjunction with a tubular skylight reflective cylinder on a roof of a building.

Alternatively, a support sleeve 28 is placed over the cylindrical light pipe and mounted firmly to the roof of the building as shown in FIGS. 20 and 21. A smaller version of the solar collection and tracking head, including the upper and lower back reflectors 1 and 2, opaque side walls 3, and/or transition tube 7 which are contained in a transparent enclosure 37 and non rotating supporting ring 43, is placed on top of sleeve 28 and sealed from water and airflow via compliant seal 52. Sleeve 28 is mounted firmly to the roof surface and at its bottom and supports the rotating head, items upper and lower back reflectors 1 and 2, opaque side walls 3, transition tube 7, upper central bearing 39, transparent or spoked lower support 42 or 44, central axis 47 and transparent or spoked mounting supports 43 or 45, and lower central bearing 40. Within the transparent enclosure 37 the mechanism comprising of the reflecting elements upper and lower back reflectors 1 and 2, opaque side walls 3, and transition tube 7 as well as support element 42 or 44 rotate (in azimuth only) around shaft 47 on bearings 39 and 40. The solar collector head thus rotates, to track the sun's movement. The rotating mechanism shown in FIG. 20 is similar in function to the mechanism shown in FIG. 4. A motor for driving the rotation is affixed to axle 47 near either bearing 39 or 40.

FIG. 21 provides a side view schematic illustration of this sixth embodiment of the invention. The base of the sleeve 28 fitting over a tubular skylight reflective cylinder is sealed to the roof through the use of roof flashing 30, using any of a variety of flashing techniques known to roofing technicians. If needed and used, sleeve 28 is made of material strong enough to support the solar collection head as well as to hold it tightly to the building in the event of high winds. This modification allows for very simple upgrades from a simple upwards-facing dome which is standard with tubular skylights to an active tracking system. All moving parts are protected from damage during installation or following installation from the effects of weather. By having all of the parts pre-assembled within the transparent dome, both the number of steps and the precision required for roof-top mounting are greatly reduced.

Instead of using diffusers at the bottom of the light pipe, retroreflectors 9 as shown in FIG. 2 for example, may be used to achieve better distribution of the resulting natural light, avoid glare, and provide for integrated electric lighting in an effective fashion.

Figure 22:
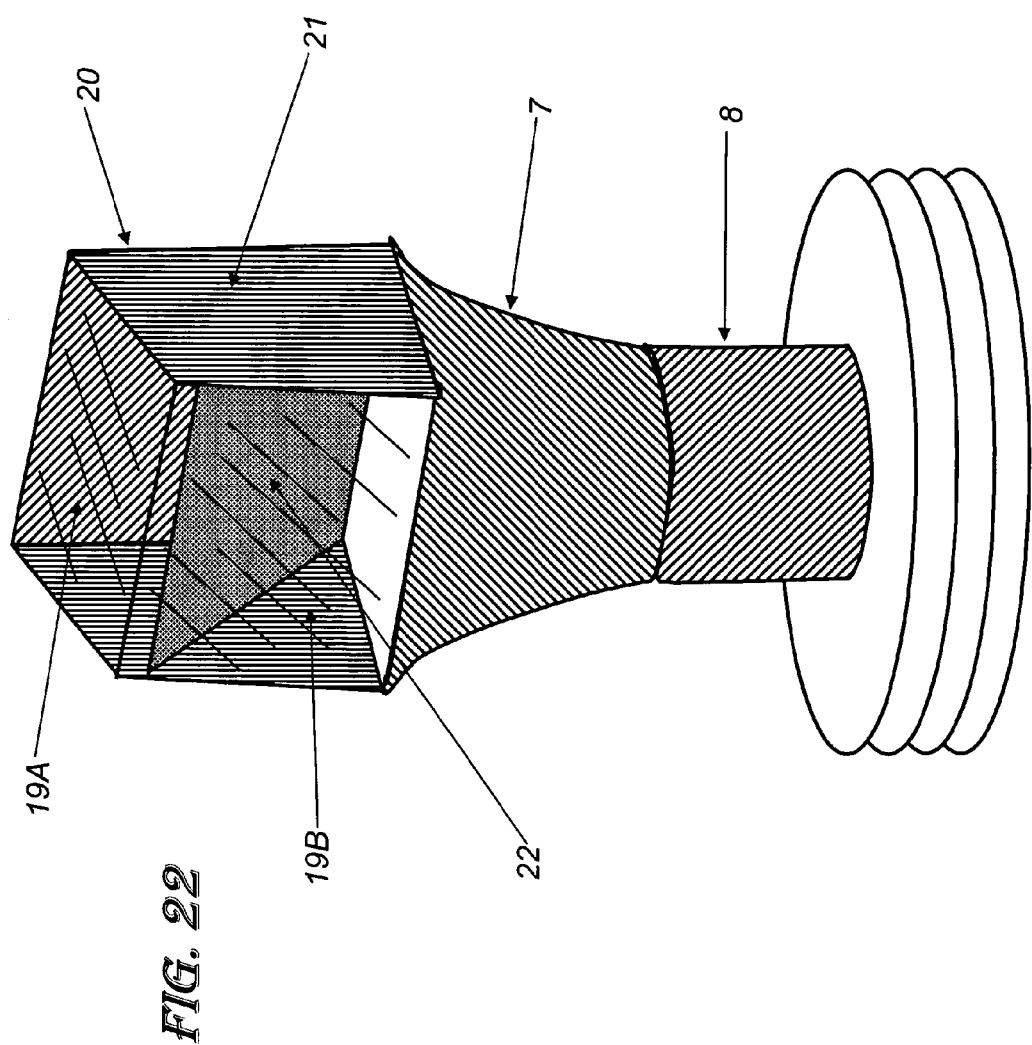
FIG. 22 shows a variation on the solar collection head with two rectangular glazings and an interior reflective solar altitude tracking mirror in the solar collection assembly.

The solar collector head can be made to accomplish two-axis tracking of the sun, improving performance over the full range of solar altitude angles at increased manufacturing cost, while keeping the same basic concept of the present invention. This alternative is illustrated in FIG. 22. The transition tube 7, the light pipe 8, and the reflective cone 9, lower reflective ring 10 and reflection rings 11 are retained. However, the sun-facing glazing 4 of the previous design is replaced by upper and lower rectangular glazings 19A and 19B and the back of the collection box 20 becomes a single opaque rectangular piece that does not have to be reflective. A single rectangular mirror 22 is placed in the box and hinged at the bottom, so that it may track the sun in altitude. The azimuth tracking assembly remains in place and in use as before, but now the fixed back reflectors 1 and 2 are replaced by the movable single reflector 22 shown in FIG. 22.

Figure 23:
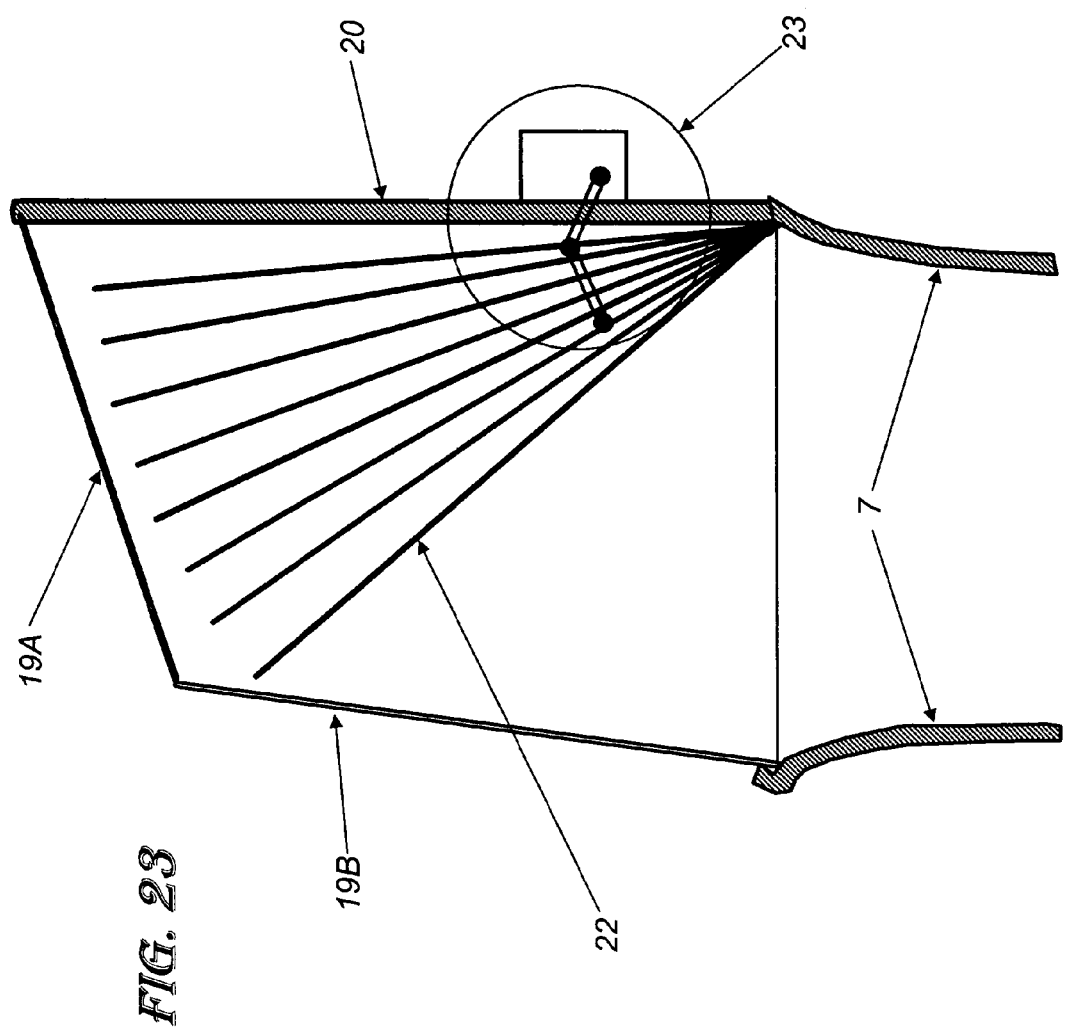
FIG. 23 is a side view of FIG. 22 showing movement of the interior reflective tracking mirror.

FIG. 23 illustrates schematically the operation of the two-axis tracking adjustable tilt tracking minor 22. An actuator assembly 23 moves the mirror back and forth on its hinge at the bottom to half the angle of the solar altitude, so that the reflected rays from the sun are beamed more nearly vertically downward into the transition tube and concentrator 7 below, and thence into the light pipe 8, for all solar altitude angles. Any of a variety of actuator methodologies may be employed to the adjustable tracking mirror 22. Either one or both of the two planar glazings 19A and 19B may be replaced in an alternative version of this design with a curved single glazing.

As previously described, various beam homogenizing reflective structures similar to those illustrated in FIGS. 13 to 16 may be added to the transition tube 7 to more evenly illuminate the solar luminaire below.

The solar lighting system of the present invention may be modified to incorporate an equatorial tracking design wherein the primary mirror rotates about an axis parallel to the axis of the Earth's rotation. Thus, the minor's rotational axis is inclined at an angle up from the horizontal equal to the site latitude. To accommodate a wide range of site latitudes, two approaches are envisioned in the design. The first is to manufacture several different models designed to work best at sites exactly on latitudes between approximately 0 degrees and approximately 90 degrees, preferably 0, 15, 30, 45, 60, and possibly 75 degrees north or south of the equator. Performance at sites between these latitudes will be slightly compromised, but not enough to degrade performance significantly, since in no case will the tilt of the equatorial axis be off by more than 7.5 degrees. The second solution to this problem will be to include a gimbled or adjustable tilt angle in the design of the product, so that it can be adjusted in the factory or in the field to the latitude of the installation.

Figure 24:
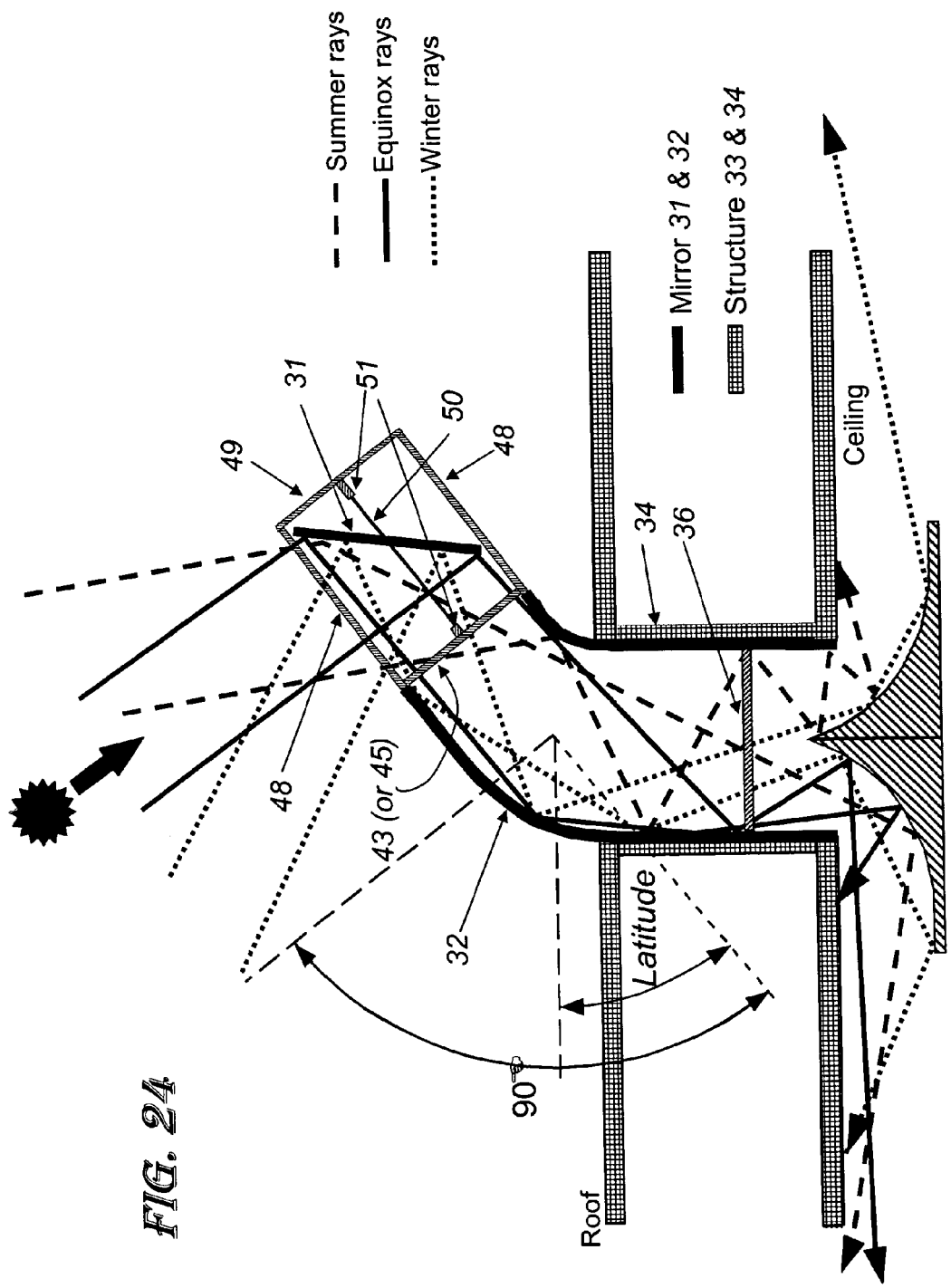
FIG. 24 is a side view of the invention incorporating an equatorial tracking mount.

Another configuration of the invention is an equatorial tracker, illustrated schematically in FIG. 24. An elliptical minor 31 rotates about axle 50 which is supported by two bearings 51 and is completely enclosed in the cylindrical transparent housing 48 and cap 49. Cylindrical transparent housing 48 holds transparent lower bearing support 43 or spoked lower bearing support 45 onto which one of the bearings 51 is mounted. The other bearing 51 is mounted to cap 49. The axis of axle 50 is aligned so that it is parallel with the axis of the earth. Practically, this means that it is tilted down from vertical in the direction of true north by the amount of 90 degrees minus the latitude of the location of the unit.

The cylindrical transparent housing is affixed to curved light pipe 32 and provides a seal from the elements of weather. Mirror 31 is rotated about axle 50 to track the movement of the sun and thus direct sunlight into curved light pipe 32. At an equinox, the rays from the sun are perpendicular to the Earth's axis and thus perpendicular to axle 50 at all times causing the reflected rays from the primary mirror 31 to be parallel to axle 50. The rotation of mirror 31 on axle 49 ensures that the reflected rays are parallel to axle 50 all day long on the equinoxes. The reflected equinoctial rays enter a curved light pipe 32 where they are reflected downward to the same retro reflectors including the redirecting reflecting faceted ring 9, the lower redirecting reflecting ring 10, redirecting reflecting rings 11A-D, and the adjusting tilt tracking mirror 22, as shown in FIG. 4 for example. Tracking primary mirror 31 is elliptical in shape, so that rays reflected from it during the equinoxes fully fill the circular aperture of the transparent cylindrical housing 48 and of the circular cross-section bent light pipe 32. A transition tube 7 is not required with this configuration. Light pipe 32 becomes cylindrical once it enters the plenum space between roof and ceiling, enclosed by housing 34.

At other times of the year rays from the sun, shown as dashed and dotted lines in FIG. 24 strike the primary mirror 31 at other than 45 degrees and are reflected into the curved light pipe 32 at varying angles, where they are still channeled down to the reflective cone 9, and other components of the ceiling luminaire described previously. With this design the transition tube 7 of previous embodiments is no longer needed.

Figure 25:
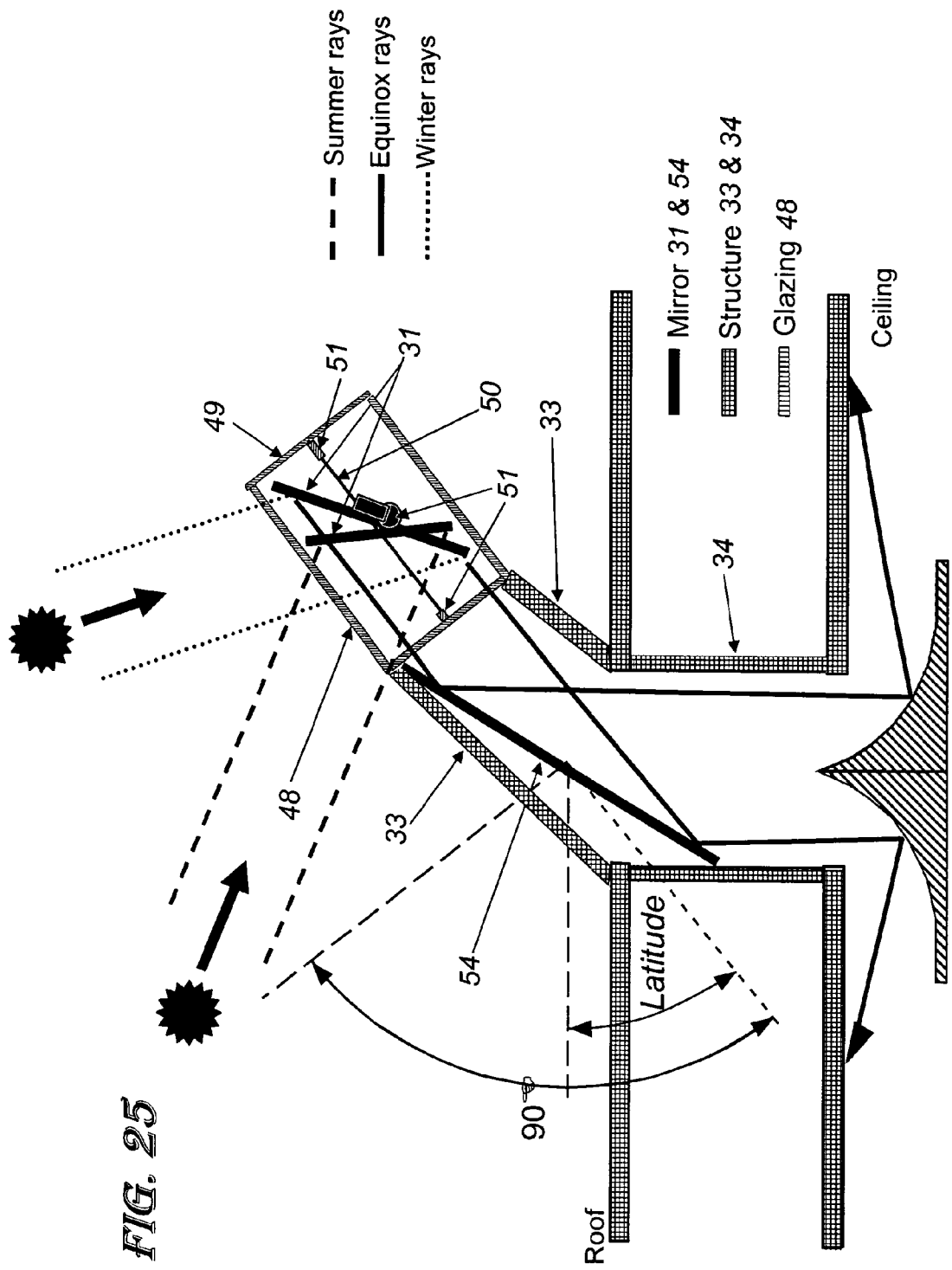
FIG. 25 is a side view of the equatorial design shown in FIG. 24.

A dual axis tracking version of the equatorial tracking design is shown in FIG. 25. In this configuration, the primary mirror 31 rotates about an axle parallel to the Earth's axis as before, but also rotates about an axis orthogonal to the axle to accommodate seasonal variations in the sun's position, thereby directing reflected sunbeams directly onto the fixed secondary mirror 54 and thence vertically downward to the solar luminaire at and below the ceiling level. Bearings and motors 51 drive the two motions of mirror 31, which is suspended on the axle 50. The cylindrical transparent cover 48 and end cap 49 are retained and the whole solar collecting head is held in place by mounting structure 33.

Figure 26:
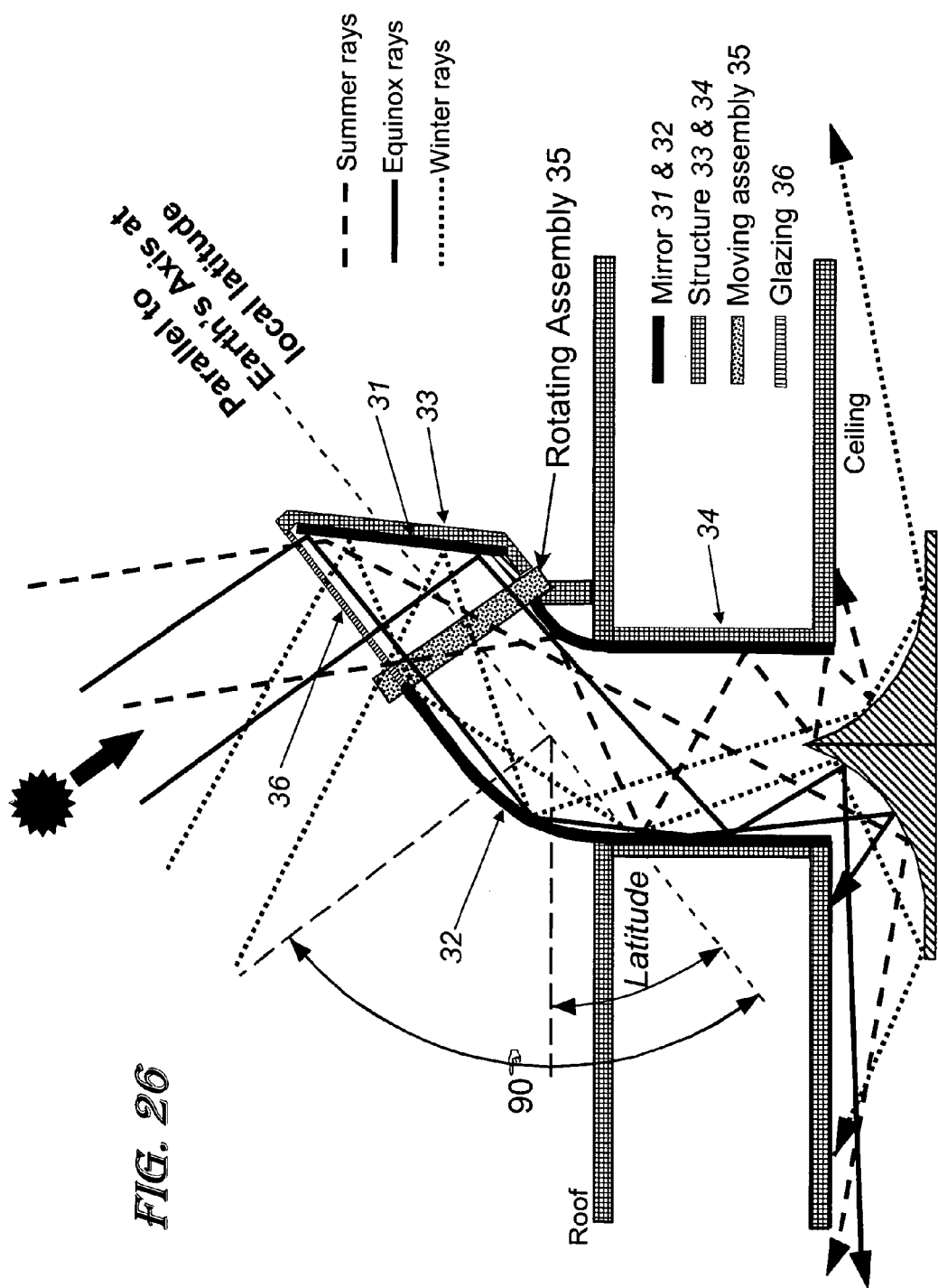
FIG. 26 is a side view of a version the design shown in FIG. 24 wherein the solar collection head rotates and tracks about an axis parallel to the Earth's axis.

Another configuration of the present invention is shown in FIG. 26 wherein the rotating mirror 31 of the equatorial designs is held inside a rotating housing 33 with a planar entrance window 36. The whole head rotates about an axis of rotation parallel to the Earth's axis of rotation. The reflected rays from the sun enter a curved cylindrical light pipe and are thereby directed downward onto the solar luminaire at the ceiling level below. The rotating assembly 35 is similar to that illustrated for the horizontal rotating ring in FIG. 3.

An open-loop means for manipulating the solar collection head with its transition tube in azimuth and the variation that includes a mirror for tracking in elevation is incorporated. The electronics involved are based on a microprocessor system that does not rely on external source of information, other than latitude, longitude, and time, to accurately point the system to the sunlight from any point on the earth's surface. The microprocessor is programmed with appropriate public domain equations of the movement of the sun so that the user only inputs latitude and longitude at time of the installation of the invention. In addition, the current local time is entered, and re-entered as needed periodically. The internal clock is very accurate so only yearly resetting is required. An alternative design includes a WWV receiver to automatically reset the time periodically.

The system employs a sensor to communicate to the control mechanism when the head is in a particular orientation for calibration purposes and then it operates automatically. In particular, the system moves the head when the error is greater than some specified tolerance from the azimuth of the sun. The system is adjusted so that looser or tighter control of pointing direction can be enabled. This permits the control system to be used with other solar devices where higher accuracy is necessary or lower accuracy is permitted and power consumption needs to be reduced.

The control system is accurate, durable, easy to set up, occupies a small package, uses very little electrical energy, and may be powered by either a small dc power supply or by Photo Voltaic cells charging either a large capacitor or battery. It includes controls to enable semi-automatic and manual adjustment of the systems steered with respect to the sun to temporarily diminish the amount of sunlight distributed to interior spaces to allow for audio visual presentations and for other reasons as desired.

In summary, the present invention provides a new method, system, apparatus and device to track the sun in azimuth and accommodate by passive or active optical means changes in solar altitude (elevation) angle over the course of a day, transferring a significant fraction of the direct beam sunlight incident on the aperture uniformly across the ceiling of a space below the device and to maintain this ceiling indirect illumination of the space reasonably constant over the course of most of the daylight hours, whenever the sun is not obscured by clouds. It thus provides well distributed light to surfaces below that is largely free of glare. It also provides modest solar heating to an amount that may be varied by adjusting the solar heat gain coefficient of the various clear and reflective optical surfaces incorporated into each configuration.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for collecting and distributing sunlight into an interior space of a building comprising the steps of:
    tracking a position of the sun with a rotatable solar collector head to receive sunlight and reflect the received sunlight downward, the rotatable solar collector head including a housing, an upper and lower back reflector and sidewall reflectors on an interior surface of the housing to capture and deflect the received sunlight downward, and an entrance aperture in a front side of the housing approximately opposite the upper and lower back reflectors and facing horizontally to allow sunlight to enter the rotatable solar collector head, wherein the rotatable solar collector head accommodates vertical solar altitude variations to increase received sunlight throughput at low sun angles and attenuate the received sunlight throughput at high angles to provide illumination throughout daylight hours;
    rotating the rotatable solar collector head with a drive mechanism about a vertical axis to track the sun's movement in azimuth;
    receiving and concentrating the reflected sunlight with a transition tube having a reflective interior surface with a first end of the transition tube connected with the rotatable solar collector head;
    further directing the reflected sunlight through a plenum space into the interior space below with a reflective light pipe connected to a second end of the transition tube; and
    disbursing the reflected sunlight onto a ceiling and walls of the interior space below with a retroreflector at the end of the reflective light pipe.

2. The method of claim 1 wherein the rotating step includes the step of:
    using a rotating track and wheel assembly to rotate the rotatable solar collector head.

3. The method of claim 1 wherein the rotating step includes the steps of:
    supporting the rotatable solar collector head on a roof of a building with a bearing; and
    supporting the bearing between the solar collector head and the light pipe with a support member to minimize solar light loss.

4. The method of claim 3 further comprising the step of:
    selecting the support member from a group consisting of a transparent surface or a plurality of narrow spokes.

5. The method of claim 1, wherein the disbursing step includes the steps of:
    shielding the sunlight emerging from the light pipe and directing light onto the ceilings and walls to be diffusely reflected to the space below using a redirecting reflecting cone with a horizontal circular reflector at a base of the reflecting cone of the retroflector.

6. The method of claim 5, further comprising the step of:
    further directing light onto the ceilings and walls to be diffusely reflected to the space below with a ceiling reflecting ring.

7. The method of claim 6, further comprising the step of:
providing a stack of horizontal reflector rings placed around the cone reflector between the ceiling reflecting ring and the horizontal circular reflector for reducing glare from the light fixture to send more light to the ceiling, wherein a diffuseness of the reflecting surfaces is varied according to a desired illumination of the room.

8. The method of claim 7 further comprising the step of:
providing a transmitting transparent sleeve around the outside of the stack of horizontal reflector rings to eliminate dust or objects from accumulating on the stack of horizontal reflector rings and to further vary the sunlight emerging from the retroflector.

9. The method of claim 6, wherein the disbursing step further comprises the step of:
redistributing rays reflected downward into the light pipe with a set of reflective surfaces in the transition tube.

10. The method of claim 6, wherein the disbursing step further comprises the step of:
redistributing rays reflected downward with a set of concentric reflective surfaces in the light pipe.

11. The method of claim 10 further comprising the step of:
selecting the set of concentric reflective surfaces from the group consisting of cylindrical, elliptical, oval, square, rectangular or tapered reflective surfaces.

12. The method of claim 1, wherein the tracking step further comprises the step of:
redistributing rays reflected downward into the transition tube and light pipe more evenly over the retroflector with a set of rectangular reflecting vanes.

13. The method of claim 1, wherein the tracking step further comprises the step of:
redistributing rays reflected downward into the transition tube or the light pipe with a crossed reflective vane.

14. The method of claim 1, further comprising the step of:
housing the rotatable solar collector head, drive mechanism and the transition tube with a transparent enclosure mounted on the roof to prevent exposure to external weather.

15. The method of claim 1 wherein the tracking step further comprises the step of:
providing a curved housing having a curved side and a curved back side with an entrance aperture approximately opposite the curved back side, a curved back reflector on the inside curved back of the curved housing, and curved side reflectors on the curved side of the housing.

16. The method of claim 1 wherein the tracking step further comprises the step of:
providing a faceted housing having a faceted side and a faceted back side with an entrance aperture approximately opposite the faceted back side, a faceted back reflector on the inside faceted back of the faceted housing, and faceted side reflectors on the faceted side of the housing.

17. The method of claim 1 wherein the tracking step further comprises the step of:
providing a hinged and rotating reflective surface within the housing to reflect sunlight downward into the transition tube, wherein the method provides two-axis tracking.

18. The method of claim 1 wherein the tracking step further comprises the step of:
providing the housing with a collection box having an opaque back panel, a transparent panel and side panels, a movable reflector hingedly connected to the collection box, and an actuator assembly for moving the reflector to track the sun in altitude and the sunlight is beamed vertically downward into the transition tube.

19. The method of claim 18 further comprising the step of:
providing the transparent panel with a transparent upper panel and a transparent lower panel.

20. The method of claim 1 further comprising the step of:
providing a second axis for tracking of the sun in elevation with a tiltable mirror pivotedly connected to the solar collector head that is rotated about a horizontal axis.

21. The method of claim 1 wherein the receiving and concentrating step comprises the step of:
increasing the illuminance emerging from the transition tube with an entrance aperture in the first end that mates to the bottom of the head and an exit aperture in the second end that is circular, wherein the circular exit aperture is smaller than the entrance aperture to increase the illuminance emerging from the circular exit aperture.

22. The method of claim 1 wherein the rotating step comprises the step of:
providing a controller for automatically adjusting alignment of the housing with respect to location of the sun through azimuthal tracking about a vertical axis.

23. The method of claim 1 wherein the disbursing step comprises the step of:
dispersing light around said room with a light diffuser at the bottom of said light tube, the diffuser including a segmented, nominally conical shape of specularly reflective material;
uniformly distributing sunlight throughout the room with surrounding planar, horizontal, parallel rings spaced vertically; and
surrounding layered rings with a cylindrical transparent cover to physically protect and be capable to spread the light emerging from the light tube.

24. The method of claim 1 further comprising the step of:
coupling an electrical light source with the housing to complement the sunlight reflected into the interior area when the sunlight falls below a desired illumination level.

25. The method of claim 24 further comprising the step of:
automatically controlling an amount of illumination from the electrical light source to maintain the desired illumination level with a controller.

26. The method of claim 1 further comprising the step of:
tracking the sunlight with a circular-aperture tracking system having a glazed aperture in the solar collector head that faces an equinoctial sun directly and a rotatable mirror with an axis of rotation that is parallel with the Earth's rotational axis, wherein the rotatable mirror reflects equinoctial rays perpendicularly into the light pipe, the light pipe having a bottom portion of which is a right circular cylinder whose axis is vertical and passes through the roof to the ceiling of the interior space.

27. The method of claim 26 wherein the receiving and concentrating step comprises the step of:
connecting an equatorial curved light pipe with a cylindrical transparent housing affixed to the curved light pipe from an external environment to the solar collector head as the transition tube.

28. The method of claim 26 wherein the tracking step further comprises the step of:
rotating a primary mirror about a first axis parallel to the Earth's axis and about a second axis orthogonal to the first axis to accommodate seasonal variations in the position of the sun;

driving the two motions of the primary mirror with a drive system; and receiving the sunlight reflected from the primary mirror and reflecting it to a fixed secondary mirror to the retroflector.

29. The method of claim 26, wherein the tracking step further comprises the step of:

rotating the head about an axis parallel to the Earth's axis of rotation with a rotatable housing with a planar entrance window.

30. The method of claim 1 further comprising the steps of:

covering an existing tubular skylight light pipe after a top dome and associated optical elements are removed with a support sleeve connected with the roof of the building, wherein the head and the transition tube are placed on top of the support sleeve; and firmly affixing a ring to the second end of the transition tube, the ring containing the drive mechanism for rotating the head.

* * * * *